United States Patent

Maeda et al.

[11] Patent Number: 5,761,695
[45] Date of Patent: Jun. 2, 1998

[54] CACHE MEMORY CONTROL METHOD AND APPARATUS, AND METHOD AND APPARATUS FOR CONTROLLING MEMORY CAPABLE OF INTERLEAVE CONTROL

[75] Inventors: Takeshi Maeda, Yokosuka; Atsuhiro Higa, Yokohama; Kenichi Nagashima, Ebina, all of Japan

[73] Assignee: Hitachi, Ltd., Tokyo, Japan

[21] Appl. No.: 714,393

[22] Filed: Sep. 16, 1996

[30] Foreign Application Priority Data

Sep. 19, 1995 [JP] Japan .................................. 7-240066
Oct. 9, 1995 [JP] Japan .................................. 7-261182

[51] Int. Cl.⁶ .......................... G06F 13/00; G06F 12/00
[52] U.S. Cl. ...................... 711/5; 711/118; 711/127; 711/157; 711/173; 711/122; 711/3
[58] Field of Search .......................... 711/5, 118, 127, 711/157, 173, 3, 122

[56] References Cited

U.S. PATENT DOCUMENTS

| | | | |
|---|---|---|---|
| 4,280,176 | 7/1981 | Tan | 711/5 |
| 4,550,367 | 10/1985 | Hattori et al. | 711/5 |
| 5,469,555 | 11/1995 | Ghosh et al. | 711/133 |
| 5,539,898 | 7/1996 | Trevett et al. | 711/167 |
| 5,574,939 | 11/1996 | Keckler et al. | 395/800 |

FOREIGN PATENT DOCUMENTS 3-296992  10/1991  Japan .

Primary Examiner—Tod R. Swann
Assistant Examiner—Mehdi Namazi
Attorney, Agent, or Firm—Antonelli, Terry, Stout & Kraus, LLP

[57] ABSTRACT

In a memory control apparatus which has a main memory constructed by a plurality of memory areas and a cache memory which can be accessed at a speed higher than that of the main memory and in which the main memory or the cache memory is accessed in response to a memory access request from an access request side and data is read out and transferred to the access request side, an accessing speed of every plurality of memory areas in the main memory is identified and an area that is cachable for the cache memory among the plurality of memory areas in the main memory is set in accordance with the identified accessing speed of every plurality of memory areas in the main memory. In a memory control apparatus for performing an interleave access or a non-interleave access to an information memory medium having a plurality of banks of different capacities, a boundary address indicative of a boundary between the interleave access area and the non-interleave access area is compared with an access address to the information memory medium, and on the basis of the comparison result, the interleave access or non-interleave access is executed to the information memory medium.

12 Claims, 22 Drawing Sheets

FIG.5

| MAPPING SIGNAL 105 | JUDGMENT SIGNAL 1 107 | JUDGMENT SIGNAL 2 109 | CS1 112/ CS2 113 | CS1-N 116/ CS2-N 117 | ACCESSING TARGET |
|---|---|---|---|---|---|
| H | H | H | H | L | CACHE SRAM |
| H | L | L | L | H | MAIN MEMORY DRAM |
| L | H | L | H | H | MAIN MEMORY DRAM |
| L | L | L | L | H | MAIN MEMORY DRAM |

FIG.6

| | CACHE MAPPING REGISTER | | | | MEMORY TYPE | COMBINATION OF BANKS OF INTERLEAVE CONSTRUCTION | CACHE START ADDRESS | IDENTIFICATION ADDRESS (CPU ADDRESS) |
|---|---|---|---|---|---|---|---|---|
| | b3 | b2 | b1 | b0 | | | | |
| a) | 0 | 0 | 0 | 0 | 256kB | NON-INTERLEAVE | 0MB~ | — |
| b) | 0 | 0 | 0 | 1 | ↑ | BANKS 0&1 | 512kB~ | A19,A20 |
| c) | 0 | 0 | 1 | 0 | ↑ | 0&1;2&3 | 1MB~ | A19,A20 |
| d) | 0 | 0 | 1 | 1 | ↑ | 0&1;2&3;4&5 | 0MB~ | — |
| e) | 0 | 1 | 0 | 0 | 1MB | NON-INTERLEAVE | 0MB~ | — |
| f) | 0 | 1 | 0 | 1 | ↑ | BANKS 0&1 | 2MB~ | A21,A22 |
| g) | 0 | 1 | 1 | 0 | ↑ | 0&1;2&3 | 4MB~ | A21,A22 |
| h) | 0 | 1 | 1 | 1 | ↑ | 0&1;2&3;4&5 | 0MB~ | — |
| i) | 1 | 0 | 0 | 0 | 4MB | NON-INTERLEAVE | 0MB~ | — |
| j) | 1 | 0 | 0 | 1 | ↑ | BANKS 0&1 | 8MB~ | A23,A24 |
| k) | 1 | 0 | 1 | 0 | ↑ | 0&1;2&3 | 16MB~ | A23,A24 |
| l) | 1 | 0 | 1 | 1 | ↑ | 0&1;2&3;4&5 | 0MB~ | — |
| m) | 1 | 1 | 0 | 0 | 16MB | NON-INTERLEAVE | 0MB~ | — |
| n) | 1 | 1 | 0 | 1 | ↑ | BANKS 0&1 | 32MB~ | A25,A26 |
| o) | 1 | 1 | 1 | 0 | ↑ | 0&1;2&3 | 64MB~ | A25,A26 |
| p) | 1 | 1 | 1 | 1 | ↑ | 0&1;2&3;4&5 | 0MB~ | — |

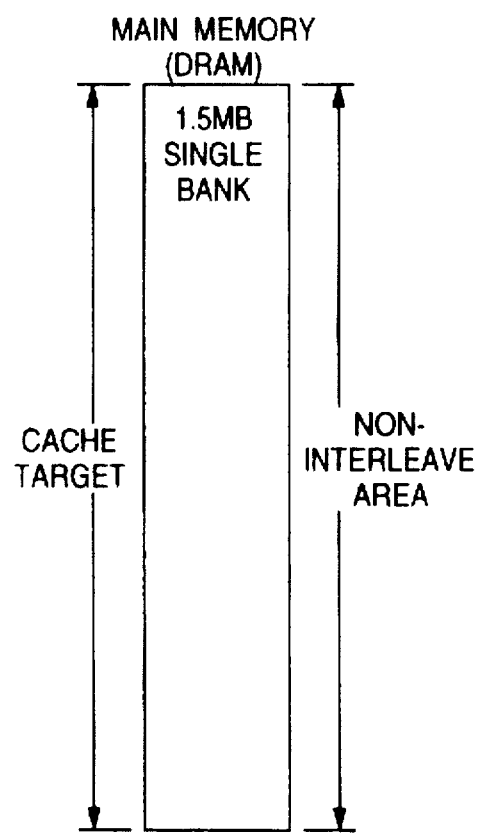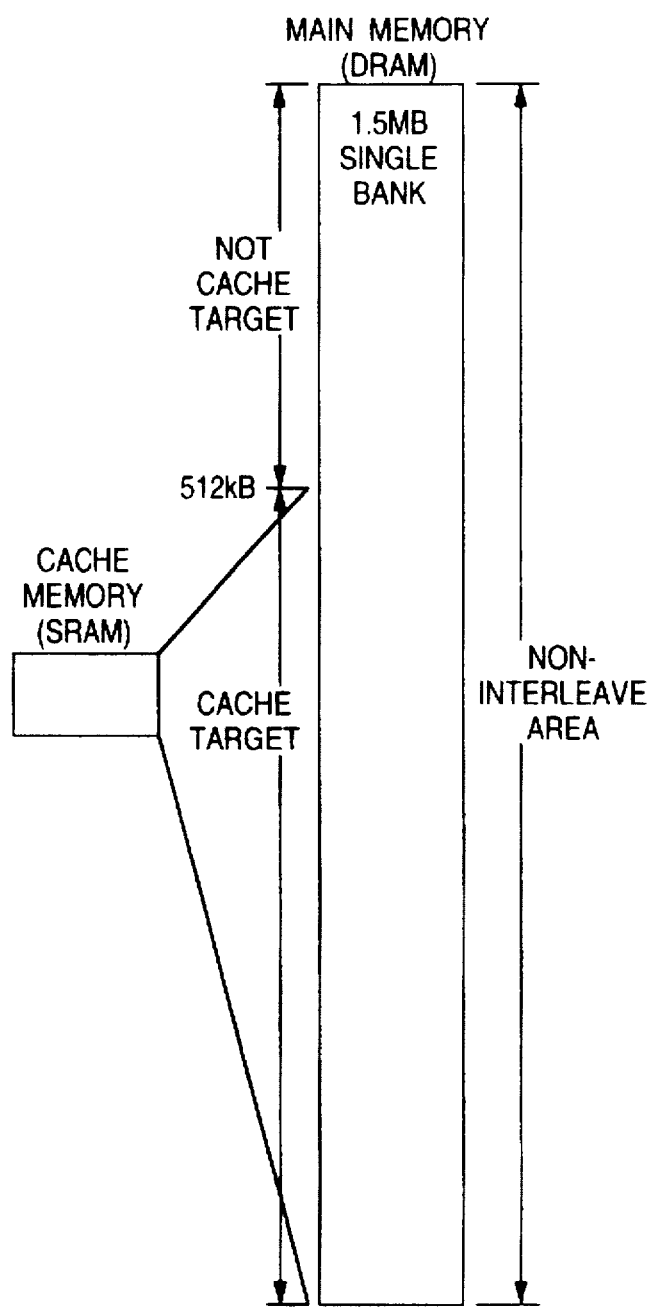

FIG.16

| | CACHE MEMORY CONTROL CIRCUIT VALID/INVALID | TAG ADDRESS | | | | | | | | | CACHE SIZE | MAIN MEMORY SIZE | CACHE TARGET MAIN MEMORY SIZE |
|---|---|---|---|---|---|---|---|---|---|---|---|---|---|
| | | Tag0 | Tag1 | Tag2 | Tag3 | Tag4 | Tag5 | Tag6 | Tag7 | Tag8 | | | |
| a) | INVALID | A17 | A18 | A19 | A20 | A21 | A22 | D | V | X | 128kB | 8MB | 8MB |
| | VALID | A17 | A18 | A19 | A20 | A21 | D | V | X | X | | | 4MB |
| b) | INVALID | A17 | A18 | A19 | A20 | A21 | A22 | A23 | D | V | 128kB | 16MB | 16MB |
| | VALID | A17 | A18 | A19 | A20 | A21 | A22 | D | V | X | | | 8MB |
| c) | INVALID | A17 | A18 | A19 | A20 | A21 | A22 | A23 | A24 | D/V | 128kB | 32MB | 32MB |
| | VALID | A17 | A18 | A19 | A20 | A21 | A22 | A23 | D | V | | | 16MB |
| d) | INVALID | A17 | A18 | A19 | A20 | A21 | A22 | A23 | A24 | A25 | 128kB | 64MB | 64MB |
| | VALID | A17 | A18 | A19 | A20 | A21 | A22 | A23 | A24 | D/V | | | 32MB |

| 1102(n-1) | 1104(n-1) | 1202(n-1) | 1102(n-2) | 1104(n-2) | 1203(n-1) | 1203(n-2) | 1106 |
|---|---|---|---|---|---|---|---|
| 0 | 0 | 0 | 0 | 0 | 1 | 1 | ? |
| 0 | 0 | 0 | 0 | 1 | 1 | 0 | 1 |
| 0 | 0 | 0 | 1 | 0 | 1 | 1 | 0 |
| 0 | 0 | 0 | 1 | 1 | 1 | 1 | ? |
| 0 | 1 | 1 | X | X | 0 | 1 | 1 |
| 1 | 0 | 1 | X | X | 1 | 1 | 0 |
| 1 | 1 | 0 | 0 | 0 | 1 | 1 | 0 |
| 1 | 1 | 0 | 0 | 1 | 1 | 0 | 1 |
| 1 | 1 | 0 | 1 | 0 | 1 | 1 | 0 |
| 1 | 1 | 0 | 1 | 1 | 1 | 1 | ? |

X : 0 OR 1
1106 = 0 : (1102>1104)
       1 : (1102<1104)
       ? : BECOMES 0 OR 1 ACCORDING TO THE
          COMPARISON RESULT OF LOWER BITS

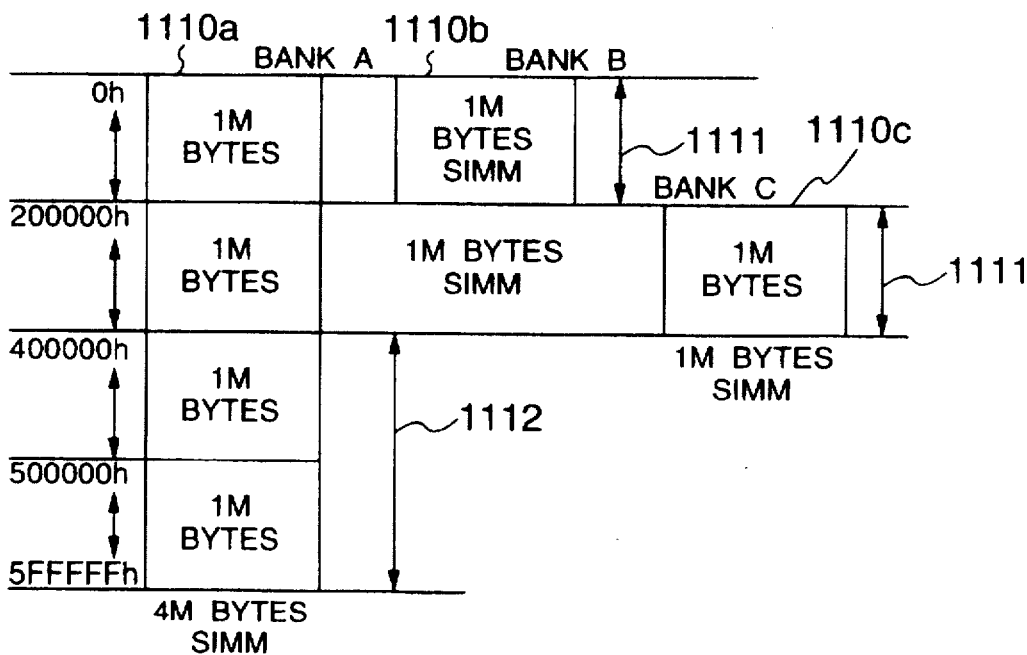

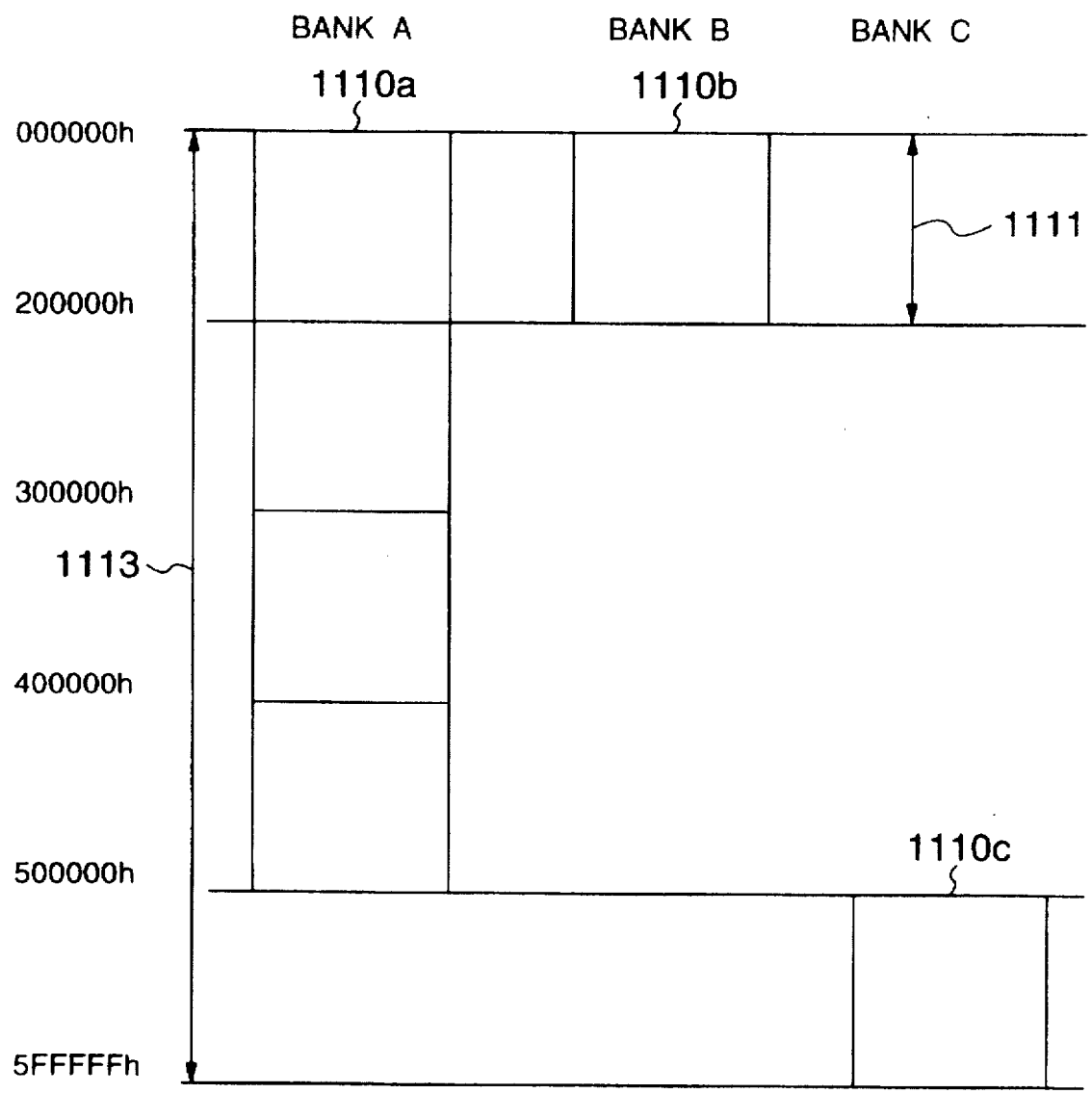

CACHE MEMORY CONTROL METHOD AND APPARATUS, AND METHOD AND APPARATUS FOR CONTROLLING MEMORY CAPABLE OF INTERLEAVE CONTROL

BACKGROUND OF THE INVENTION

The invention relates to control method and apparatus of a cache memory and control method and apparatus of a memory capable of interleave control. More particularly, the invention relates to control method and apparatus of a cache memory which can improve an accessing speed of the memory and control method and apparatus of a memory capable of interleave control in an information processing apparatus having a cache memory and a main memory and in an information processing apparatus having a memory capable of interleave control.

Hitherto, a control method of a main memory in which, as information recording media, a static random access memory (hereinafter, referred to as SRAM) is used in a cache memory and a dynamic random access memory (hereinafter, referred to as DRAM) is used in a main memory and such a cache memory is installed has been disclosed in, for example, JP-A-3-296992 [prior art (1)]. In this case, a technique such that by arranging the DRAM as a main memory and the SRAM as a cache memory onto the same chip and by using parts of column addresses of the DRAM as addresses of the SRAM, the number of entries of a data block is increased, and by improving a hit ratio to the cache memory, a high speed access is performed has been known.

FIG. 1 is a block constructional diagram of a semiconductor memory apparatus in which a main memory having therein a cache memory is installed and which has been disclosed in JP-A-3-296992.

In FIG. 1, reference numeral 701 denotes a multiprocessor (hereinafter, referred to as a CPU); 702 a cache control circuit; 703 a tag portion; 704 a multiplexer; 705 a DRAM control circuit; 706 a main memory unit having therein a cache memory (hereinafter, referred to as a main memory unit); 707 a DRAM unit; 707a to 707d DRAM data bit plane units; 707e a parity bit plane unit; 708 an SRAM unit; 708a to 708d SRAM data bit plane units; 709 an ECC circuit unit; 710 a CPU addresses A0 to A17; 711 way addresses WA0 and WA1; 712 a cache hit signal CH; 713 memory addresses A0 to A8 and A9 to A17; 714 an RAS-N/CAS-N signal; 715 a UCE flag; 716 an EF flag (error flag); 717 a transfer control signal BT; and 718 data buses DQ1 to DQ4.

FIG. 2 is a timing chart showing the operation of the semiconductor memory apparatus shown in FIG. 1.

The schematic operation of the semiconductor memory apparatus according to a prior art shown in FIGS. 1 and 2 will now be described.

In FIG. 1, the tag portion 703 includes a tag memory, a comparator, and a replacement logic executing unit. 64 sets of row address signals RA0 to RA8 have been stored as tag addresses in the tag portion 703. Each set includes four sets of tag addresses in correspondence to four ways W1 to W4. The CPU 701 generates address signals A0 to A17 (710). The address signals A0 to A8 (710) are inputted as tag addresses and the address signals A9 to A14 are inputted as set addresses to the comparator of the tag portion 703. The comparator compares the four sets of row address signals RA0 to RA8 (entry addresses) stored in the set corresponding to the set addresses A9 to A14 (710) with the inputted tag addresses 710. When the tag addresses A0 to A8 (710) coincide with any one of the four sets of row address signals RA0 to RA8, the way addresses WA0 and WA1 (711) corresponding to the coincident row address signals RA0 to RA8 are outputted and the cache hit signal 712 at the high ("H") level is outputted.

While the comparison is being executed by the comparator of the tag portion 703, the memory address signals A9 to A17 (713) are inputted as cache addresses to the SRAM unit 708 in the main memory unit 706 by the multiplexer 704 and the SRAM unit 708 is simultaneously accessed. Thus, data of 16 bits as many as four ways corresponding to the memory address signals A9 to A17 (713) is outputted.

As shown in the timing chart of FIG. 2, when a cache hit occurs in its cycle, the way addresses WA0 and WA1 (711) are outputted from the tag portion 103. In response to the way addresses WA0 and WA1 (711), one of the four ways W1 to W4 is selected by a way decoder in the main memory unit 706. Thus, the data 718 of total four bits is outputted. In this manner, a high speed access is realized in case of the cache hit.

If a cache miss occurs in the above cycle, an access of the DRAM unit 707 is executed by a row address strobe signal and a column address strobe signal 714 (hereinafter, referred to as RAS-N/CAS-N signals) which are generated from the DRAM control circuit 705. In this case, the cache hit signal 712 is set to the low ("L") level.

In response to the "L" level cache hit signal 712, a column address buffer in the main memory unit 706 latches the memory addresses A9 to A17 (713) given from the multiplexer 704. Subsequently, the multiplexer 704 gives the memory addresses A0 to A8 (713) to the main memory unit 706.

In response to a trailing edge of the RAS-N signal 714, a row address buffer in the main memory unit 706 supplies the memory addresses A0 to A8 (713) as row address signals RA0 to RA8 to a row decoder in the main memory unit 706.

After that, in response to a trailing edge of the CAS-N signal 714, the column address buffer in the main memory unit 706 supplies the latched memory addresses A9 to A17 (713) as column address signals CA0 to CA8 to a column decoder in the main memory unit 706. Thus, a data block of eight bits is read out from each of the DRAM data bit plane units 707a to 707d.

The data of total 32 bits read out from the four DRAM data bit plane units 707a to 707d is transferred to the ECC circuit unit 709 together with check bits of eight bits read out from the parity bit plane unit 707e. When there is no error or there is a correctable error in the transferred data, the UCE flag 715 is held at the "L" level as shown in a timing chart of FIG. 8.

When there is no error, the EF flag 716 is held at the "L" level. When there is a correctable error, the EF flag 716 rises to the "H" level. When an error which cannot be transferred exists in the transferred data, the UCE flag 715 and EF flag 716 rise to the "H" level. In this case, the data including the error is outputted. The data transfer from the DRAM unit 707 to the SRAM unit 708 at the time of a mis-read or mis-write is controlled by the transfer control signal BT 717 which is given by the cache control circuit 702. The address signals A0 to A8 and A9 to A17 shown in FIG. 2 indicate the memory addresses 713 which are outputted from the multiplexer 704.

According to the conventional technique as mentioned above, by constructing the DRAM as a main memory and the SRAM which is used as a cache memory onto the same chip and by using parts of the column addresses of the DRAM as addresses of the SRAM as a cache memory, the number of data block entries of the cache can be increased, so that the main memory can be processed by a high speed access.

In an information processing apparatus having a memory, on the other hand, for example, an interleave access is widely known as a method of improving an accessing speed of the memory.

The above interleave access has been disclosed in, for example, "A Separate Volume of Interface Bootstrap Project-2 No. 4", published by CQ publishing Co., Ltd., pages 85–87, Jul. 1, 1993, [prior art (2)]. An outline of such a prior art is that in a main memory using a dynamic random access memory (hereinafter, referred to as a DRAM), two sets of DRAMs are prepared and are set to independent banks of the same construction, addresses are alternately allocated to the two sets of banks, and the addresses are alternately read out or written from/into the two sets of banks in response to an access of continuous addresses.

In the foregoing interleave access, when a central processing unit accesses the data in continuous addresses, the mutual banks can be made operative so as to interpolate a disable period, so that the memory access can be executed at a speed higher than that in the non-interleave access in which only each set of bank is accessed.

SUMMARY OF THE INVENTION

In the prior art (1), however, since the DRAM as a main memory and the SRAM for the cache memory are formed on the same chip, an SRAM for a cache built in a certain chip cannot be allocated to a DRAM of another chip.

When a memory is constructed by using a plurality of such chips, even in the case where the DRAM serving as a main memory can be interleave controlled among the chips, it is presumed that the whole address area of the DRAM becomes a cache target of the cache memory that is integrated with the DRAM. In such a case, since the DRAM becomes an interleave control target and the cache target, the improvement of the performance due to the use of the cache memory is not admitted. Namely, the cache memory becomes a redundant circuit and is in vain, so that there is a fear such that it doesn't contribute to the improvement of the accessing speed to the main memory.

Since the DRAM serving as a main memory and the SRAM serving as a cache memory are fixedly formed as one chip, it is difficult to add only the cache memory to the outside. Namely, when the cache memory is added to the outside for the main memory and cache memory which were formed as one chip, a problem such that consistency of data cannot be held between the main memory and cache memory formed as one chip and the cache memory added to the outside or the like occurs. When another chip is added in order to increase a capacity of the cache memory built in the chip, a capacity of the main memory (DRAM) in addition to the cache memory is also increased, so that it is considered that a desired memory construction cannot be obtained.

On the other hand, according to the interleave accessing method of the prior art (2), the memories of the banks have the same construction and the memory capacity of each bank has to be equal. When the memory of a different memory capacity is allocated to each bank, therefore, the interleave access cannot be performed and it is necessary to execute what is called a non-interleave access in which the access of only one set of bank is executed. There is a problem such that the memory accessing speed is inferior to the case of allocating the memory of the same capacity to each bank and executing the interleave access.

In the interleave access of the prior art (2), when the memory is expanded or the like, it is necessary to use a plurality of banks of the same memory capacity. Therefore, there are problems such that there is a limitation in a combination of the memories which can be used and an information memory medium constructed by such a plurality of banks is expensive.

It is an object of the invention to provide control method and apparatus of a cache memory which can improve an accessing speed of a memory and to provide control method and apparatus of a memory capable of interleave control.

Another object of the invention is to provide control method and apparatus of a cache memory, in which a cache target area in a main memory is set in accordance with an accessing speed of every area in the main memory, thereby enabling the main memory to be accessed at a high speed.

Still another object of the invention is to provide control method and apparatus of a memory, in which even in a memory having a plurality of banks of different memory capacities, an interleave control can be performed among the banks and the memory can be accessed at a high speed.

Further another object of the invention is to provide control method and apparatus of a memory, in which in a memory having a plurality of banks, even when capacities of the banks are changed, an interleave control can be performed among the banks and the memory can be accessed at a high speed.

According to an aspect of the invention, there is provided a cache memory control method in a memory control apparatus which has a main memory constructed by a plurality of memory areas and a cache memory that can be accessed at a speed higher than that of the main memory and in which the main memory or cache memory is accessed in response to a memory access request from an access request side and data is read out and transferred to the access request side, wherein a) an accessing speed of every plurality of memory areas in the main memory is identified and b) an area which is cachable for the cache memory among the plurality of memory areas in the main memory is set in accordance with the discriminated accessing speed of every plurality of memory areas in the main memory.

According to an example of the invention, the above step a) has a step of identifying the accessing speed every plurality of memory areas in the main memory by identifying whether the memory area is an area which can be interleave controlled or an area which cannot be interleave controlled, and the above step b) has a step of, when it is determined that the memory area in the main memory is the area which cannot be interleave controlled, setting at least a part of such an area to an area that is cachable for the cache memory and, when it is determined that the memory area in the main memory is an area which can be interleave controlled, setting at least a part of such an area to an area that is not cachable for the cache memory.

That is, according to the invention, with such a construction, the area which becomes a cache target among the memory areas in the main memory (namely, area such that an access area to the main memory becomes an accessing target to the cache memory) is set in accordance with the accessing speed of every memory area in the main memory, namely, the construction of the main memory (for example, interleave construction or non-interleave construction), thereby enabling the main memory to be accessed at a high speed. That is, the area of the non-interleave construction (namely, construction in which the interleave control is impossible) in which the accessing speed is relatively slow in the main memory is preferentially set to the cache target (namely, the cache memory is allocated) over the area of the interleave construction (construction in which the interleave control is possible) in which the accessing speed is relatively high, thereby enabling the main memory to be accessed at a high speed.

According to an example of the invention, further, there is provided a step of, when the data in the cache memory is updated, adding at least one of cache address information and information to realize a high memory accessing speed and to maintain consistency of data of the main memory and the cache memory and giving as tag information to the cache memory.

Namely, among the address areas in the main memory, since there is the address area which doesn't become the cache target, the address information corresponding to such an area can be deleted from a cache tag SRAM and the address information can be reduced more than that in the prior art. Therefore, since the address information which is stored into the cache tag SRAM is reduced as mentioned above, information [dirty bit (D)] to realize a high processing speed, information [valid bit (V)] to maintain consistency of the data between the main memory and the cache memory, and the like are added to the cache address information and can be stored into the cache tag SRAM. Consequently, further, the high accessing speed can be realized and the consistency of the data can be assured.

According to another aspect of the invention, there is provided a memory control method of performing an interleave access or non-interleave access to an information memory medium having a plurality of banks of different capacities, wherein:

a) an interleave access area which can be interleave accessed and a non-interleave access area which cannot be interleave accessed are set into the information memory medium;

b) a boundary address indicative of a boundary between the interleave access area and the non-interleave access area and an access address to the information memory medium are compared, thereby discriminating in which one of the interleave access area and the non-interleave access area the access address exists; and c) when it is determined in the above step b) that the access address exists in the interleave access area, the interleave access is performed to the information memory medium and, when it is discriminated that the access address exists in the non-interleave access area, the non-interleave access is performed to the information memory medium.

With such a construction, even in the memory having a plurality of banks of different memory capacities, whether the access address exists in the interleave access area or not is determined on the basis of the boundary address and the interleave control can be performed among the banks, so that the memory can be accessed at a high speed.

Further, according to an example of the invention, the above step a) has a step of setting all of the memory areas of the smallest memory capacity among the plurality of banks of different memory capacities of the information memory medium and the memory area of the same memory capacity as that of all of the memory areas of the bank of the smallest memory capacity among all of the memory areas of all of the banks in the information memory medium other than the bank of the smallest memory capacity are set as interleave access areas and that the areas other than the areas set as interleave access areas among all of the memory areas of all of the banks in the information memory medium are set to the non-interleave access areas.

As mentioned above, even in the memory having a plurality of banks of different memory capacities, the areas of the same memory capacity among the banks are set as an interleave access area, thereby enabling the interleave control to be performed among the banks, so that the memory can be accessed at a high speed.

Even when the memory capacities of a plurality of banks are changed, therefore, the interleave access area and the non-interleave access area of the information memory medium can be changed, so that the boundary address between them can be also changed and the memory access can be performed at a high speed.

According to an example of the invention, in such a construction, at least a part of the interleave access area or the non-interleave access area can be set to a cache target.

BRIEF DESCRIPTION OF THE DRAWINGS

FIG. 5 is a diagram for explaining the relation between each signal in FIG. 3 and accessing targets;

FIG. 6 is a diagram for explaining the relations among various kinds and constructions of main memories and various operating modes of the main memories;

FIGS. 11A and 11B are diagrams showing another example of an address mapping of the cache memory when the main memory has the first memory construction;

FIG. 16 is a diagram showing a list of tag address set values in the cache control circuit in FIG. 3;

FIG. 23 is a diagram showing an example of an allocation of local bus addresses to memory addresses in the information memory medium with the construction of FIG. 21;

FIG. 24 is an address map diagram when an SIMM of 1 Mbytes is added in the information memory medium with the construction using the SIMM of 1 Mbytes and the SIMM of 4 Mbytes as an information memory medium in the embodiment of FIG. 17;

FIG. 25 is an address map diagram after the boundary address was changed in the information memory medium with the construction shown in FIG. 24;

FIG. 26 is a diagram showing an example of an allocation of local bus addresses to memory addresses in the information memory medium with the construction of FIG. 25.

DESCRIPTION OF THE PREFERRED EMBODIMENTS

An embodiment of control method and apparatus of a cache memory and control method and apparatus of a memory capable of interleave control according to the invention will now be described in detail hereinbelow with reference to the drawings.

Figure 3:
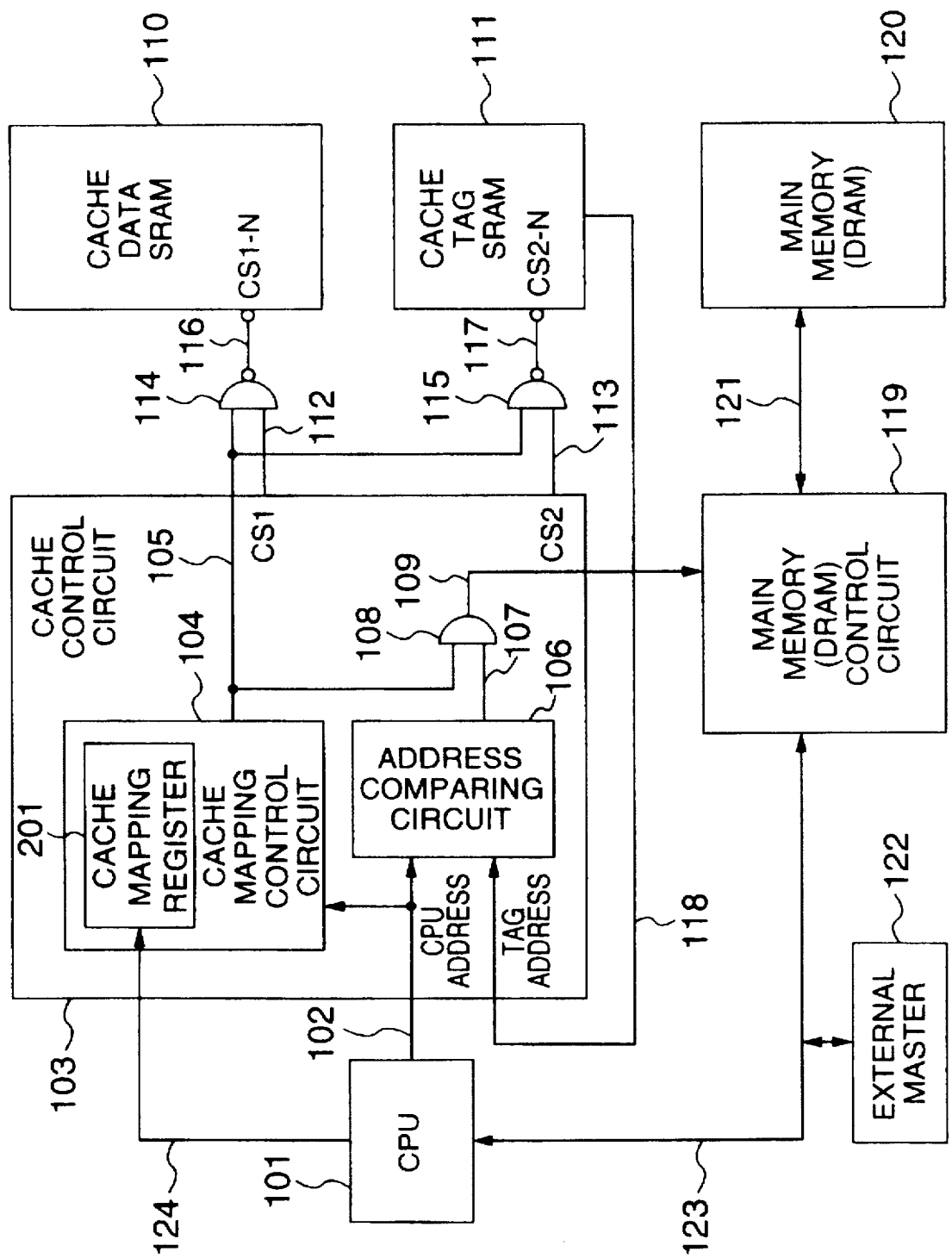
FIG. 3 is a block diagram showing a schematic construction of an information processing apparatus in which a cache control circuit is installed and to which an embodiment of a control method of a cache memory according to the invention is applied.

FIG. 3 is a block diagram showing a schematic construction of an information processing apparatus in which a cache control circuit is installed and to which an embodiment of the control method of a cache memory according to the invention is applied.

In FIG. 3, reference numeral 101 denotes a central processing unit (hereinafter, referred to as a CPU); 102 a CPU address which is outputted from the CPU 101; 103 a cache control circuit; 104 a cache mapping control circuit to perform a main control in the embodiment; 105 a cache mapping control signal (hereinafter, referred to as a mapping signal) which is outputted from the cache mapping control circuit; 106 an address comparing circuit for determining a cache hit/cache miss in each memory access; 107 a signal indicative of an address comparison determination result which is outputted from the address comparing circuit 106 (hereinafter, referred to as a determination signal 1); 108 an AND gate; 109 a signal indicative of an address comparison determination result in which a state of the mapping signal 105 is reflected to the determination signal 1 (107) (hereinafter, referred to as a determination signal 2); 110 a static random access memory for cache data (hereinafter, referred to as a data SRAM); 111 a static random access memory for a cache tag (hereinafter, referred to as a tag SRAM) to hold a cache address; 112 a chip selection signal (hereinafter, referred to as a CS1) which is outputted from the cache control circuit 103 in order to select data in the data SRAM 110; 113 a chip selection signal (hereinafter, referred to as a CS2) which is outputted from the cache control circuit 103 in order to select the tag SRAM 111; 114 an NAND gate 1; 115 an NAND gate 2; 116 a chip selection signal (hereinafter, referred to as a CS1-N) which is outputted from the NAND gate 1 (114) and is supplied to the data SRAM 110; 117 a chip selection signal (hereinafter, referred to as a CS2-N) which is outputted from the NAND gate 2 (115) and is supplied to the tag SRAM 111; 118 a tag address which is outputted from the tag SRAM 111; 119 a main memory control circuit (hereinafter, referred to as a DRAM control circuit); 120 a main memory (hereinafter, referred to as a DRAM); 121 a DRAM 120 control signal (hereinafter, referred to as a DRAM control signal) which is outputted from the DRAM control circuit 119; 122 an external master apparatus; and 123 and 124 signal lines. For example, like a DMA controller, a bus using right is given to the external master apparatus 122 in place of the CPU and the external master apparatus 122 accesses the main memory.

The information processing apparatus of the embodiment has the above construction and sets a cache target area (area in which an access area to the main memory is an accessing target to the cache memory) in the main memory in accordance with an accessing speed of every area in the main memory, namely, a construction (for example, whether it is an interleave construction or a non-interleave construction), thereby enabling the main memory to be accessed at a high speed. That is, an area of the non-interleave construction of a relatively low accessing speed (namely, construction which cannot be interleave controlled) is preferentially set to a cache target as compared with an area of the interleave construction of a relatively high accessing speed (construction which can be interleave controlled) (namely, the cache memory is allocated), thereby enabling the main memory to be accessed at a high speed.

According to the embodiment, for this purpose, there is provided the cache mapping control circuit 104 for determining whether the access area for the main memory of the CPU is the cache target or not and outputting the cache mapping signal 105 indicative of the determination result. Further, in response to the cache mapping signal 105 from the cache mapping control circuit, the cache memory is selectively accessed.

In the embodiment, although the DRAM has been used as a main memory and the SRAM has been used as a cache memory as an example, memories of other forms can be also used.

An outline of the operation of the information processing apparatus of the embodiment will now be described hereinbelow by using FIG. 3.

As shown in FIG. 3, the CPU 101 first requests a memory access and, at the same time, outputs the CPU address 102. The CPU address 102 is supplied to the address comparing circuit 106 in the cache control circuit 103 and is compared with the tag address 118 which is outputted from the tag SRAM 111 and the determination signal 1 (107) is outputted. At the same time, the cache mapping control circuit 104 outputs the mapping signal 105 in accordance with a construction form of the main memory and an address area of the memory access that is requested by the CPU 101. The mapping signal 105 is used for the access control of the data SRAM 110, tag SRAM 111, and DRAM control circuit 119. For the data SRAM 110, the CS1-N signal 116 is formed by the NAND gate 114 by using the mapping signal 105 and the CS1 signal 112 which is outputted from the cache control circuit 103. For the tag SRAM 111, the CS2-N signal 117 is formed by the NAND gate 115 by using the mapping signal 105 and the CS2 signal 113 which is outputted from the cache control circuit 103. Further, for the DRAM control circuit 119, the determination signal 2 (109) is formed by the AND gate 108 by using the mapping signal 105 and the determination signal 1 (107). In accordance with the state of the determination signal 2 (109), the DRAM control circuit 119 performs an output control of the DRAM control signal 121 for the DRAM 120.

FIG. 5 is a list table showing memory accessing targets in the states of various signals in the schematic constructional diagram of the information processing apparatus shown in FIG. 3. For simplicity of explanation, it is assumed that a consideration about consistency of the data between the main memory and the cache memory is omitted and a consideration about only the accessing performance is made. Therefore, in the operation at the time of a cache miss in a memory reading cycle in FIG. 5, the reading cycle from the main memory is set to an accessing target and the writing operation to the cache memory which is inherently simultaneously executed because of the consistency of the data between the main memory and the cache memory is omitted. Even in a cache hit cycle, consequently, an access to the cache memory is inhibited and an access to the main memory is performed in dependence on a confirmation result of the construction state of the DRAM 120 by the cache mapping control circuit 104.

Figure 4:
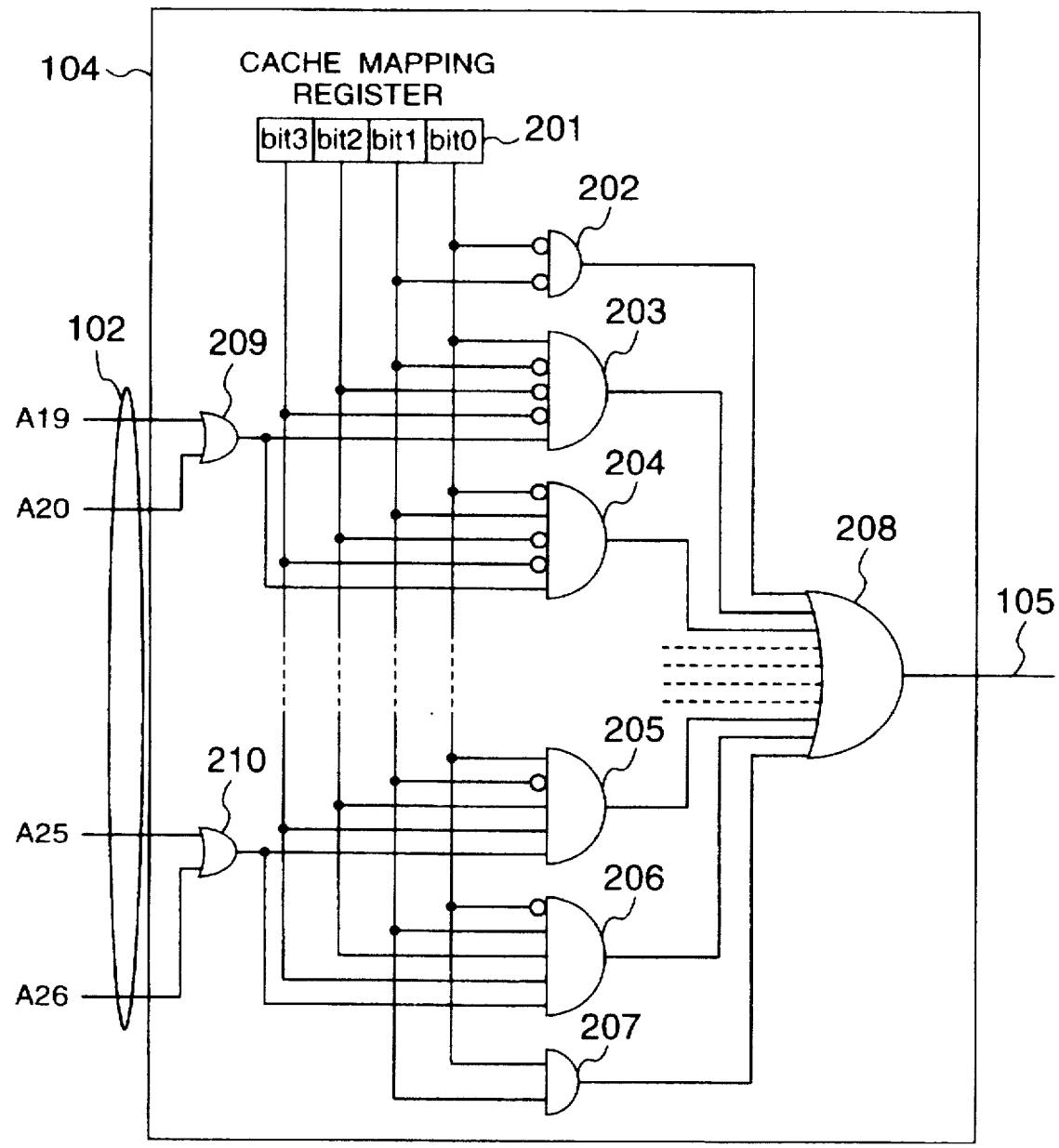
FIG. 4 is a diagram showing a constructional example of a cache mapping control circuit in FIG. 3.

FIG. 4 is a detailed constructional diagram of an example of the cache mapping control circuit 104 to perform the main control in the embodiment.

In FIG. 4, reference numeral 201 denotes a cache mapping register as holding means in which accessing speed information of each memory area (bank) in the main memory has been stored; 202 to 207 AND gates; and 208 to 210 OR gates.

FIG. 6 shows various operating modes according to various kinds and constructions of the DRAM 120 in the detailed constructional diagram shown in FIG. 4. FIG. 6 shows a case where the capacity of one bank is set to 256 kB, 1 MB, 4 MB, and 16 MB as types of main memory and a case where there are total six banks of the banks 0 to 5 as a bank construction of the main memory. However, in the following explanation, the memory type of 256 kB per bank will be described as an example.

In FIG. 6, "memory type" indicates the kind of main memory and, specifically speaking, it denotes a capacity of each bank of the main memory. "combination of the banks of the interleave construction" denotes a construction of the main memory. The construction of the main memory denotes a combination of a plurality of memory boards formed as modules. Specifically speaking, it indicates whether the combined memories have a bank construction (namely, construction formed by a plurality of banks) or a non-bank construction (namely, single bank construction). Further, in case of the bank construction, it indicates whether the combined memory banks have an interleave construction (construction which can be interleave controlled) or a non-interleave construction (construction which cannot be interleave controlled).

A cache start address indicates a start address in the main memory which becomes a cache target. An identification address shows upper two bits of the CPU address. For example, in case of b), f), j), and n) in FIG. 6, the identification address denotes that in case of "0" and "0", either the bank 0 or bank 1 is accessed and when one of them is equal to "1", the bank of the bank 2 or more is accessed.

Among data b3, b2, b1, and b0 of four bits which are set into the cache mapping register 201, upper two bits (b3, b2) indicate the memory type and, for example, when the memory types are set to 256 kB, 1 MB, 4 MB, and 16 MB, they are set to (0,0), (0,1), (1,0), and (1,1), respectively. Lower two bits (b1, b0) indicate the memory construction. For example, in case of the non-interleave construction, they are set to (0,0). When only the banks 0 and 1 have the interleave construction, they are set to (0,1). When the banks 0 and 1 and the banks 2 and 3 have the interleave construction, they are set to (1,0). When the banks 0 and 1, the banks 2 and 3, and the banks 4 and 5 have the interleave construction, they are set to (1,1).

Subsequently, a method of setting the data into the cache mapping register 201 will now be described. The data in the cache mapping register 201 is set in accordance with the construction of the main memory 120 and its setting method will now be described hereinbelow.

As a setting method, there are a setting method by hardware and a setting method by software. The setting method by the hardware is executed as follows. Namely, the DRAM as a main memory is generally formed as a module so that the user can arbitrarily change the construction and is constructed by an SIMM (single inline memory module) and a DIMM (dual inline memory module). When the module is inserted into a slot on a mother board, the main memory control circuit 119 recognizes an identification code (ID code) which is outputted by the module and supplies the memory type as a recognition result to the CPU 101, so that the CPU 101 determines the construction of the main memory 120 and sets the data into the cache mapping register 201 on the basis of the determination result.

According to the setting method by the software, the CPU 101 determines the construction of the main memory from the data read out by performing the reading/writing operation to the main memory 120 and sets the data into the cache mapping register 201 on the basis of the determination result.

Means for storing the data indicative of the construction of the main memory 120 is not limited to the register but any other kinds of memories can be also used.

Figure 7:
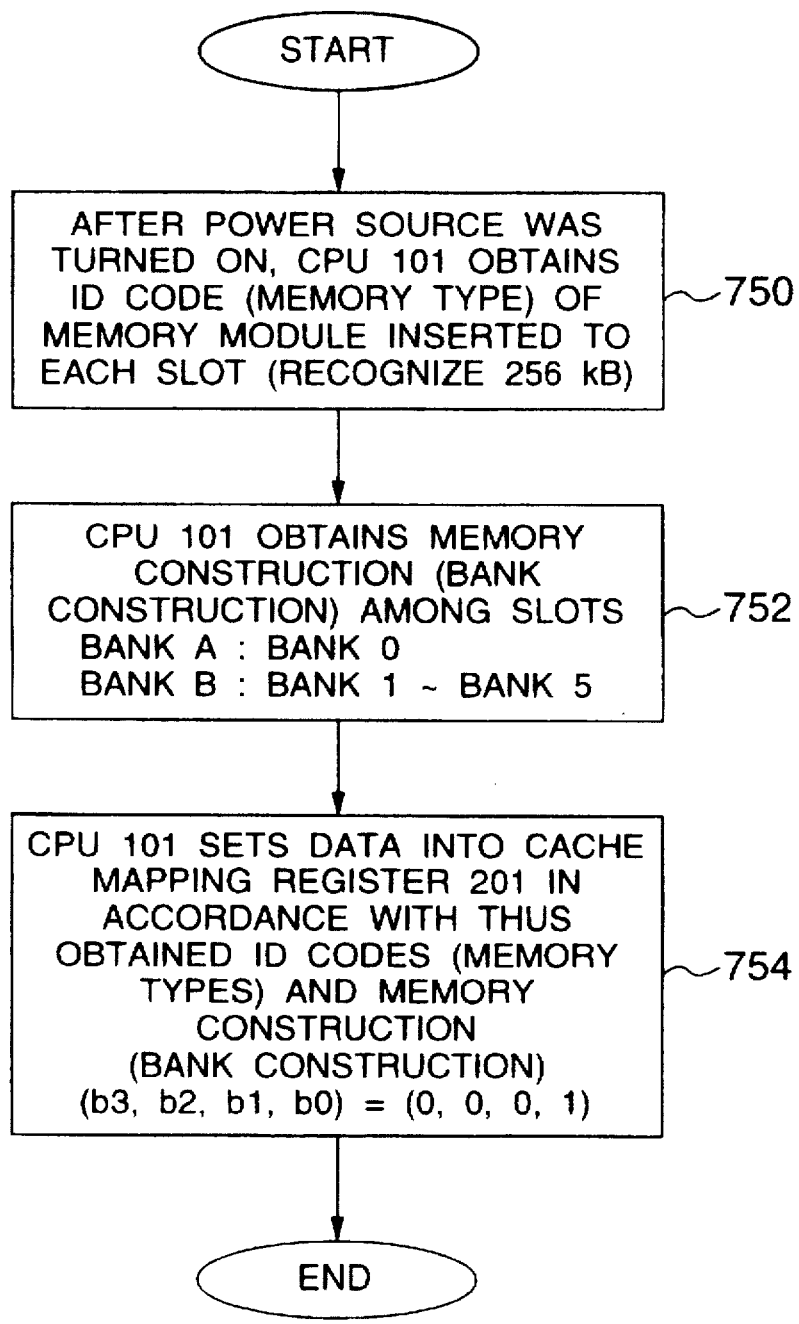
FIG. 7 is a flowchart for explaining a method of setting data into a cache mapping register in FIG. 3 by hardware.
Figure 8:
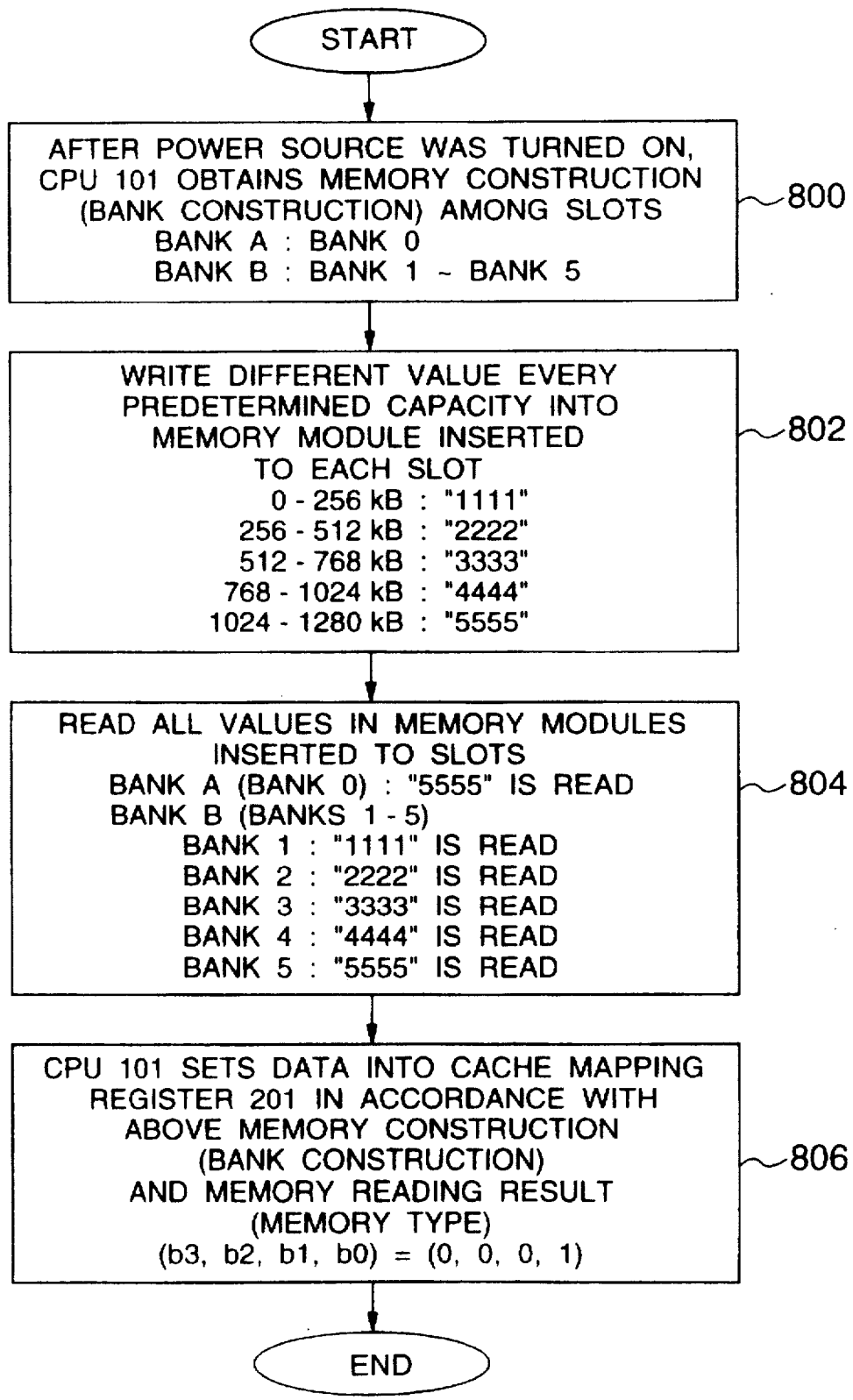
FIG. 8 is a flowchart for explaining a method of setting data into the cache mapping register in FIG. 3 by software.

The setting method by the hardware will be first explained with reference to a flowchart of FIG. 7. It is assumed that the flowcharts of FIGS. 7 and 8 are executed by programs built in the CPU 101. In the description of FIGS. 7 and 8, the memory type of the main memory is set to 256 kB (kilobytes) and as for the construction, explanation will now be made with respect to an example in which, as shown in, for example, FIG. 12, the main memory is constructed by two memory modules (bank A, bank B), the bank A is constructed by the bank 0, the bank B is constructed by the bank 1 to bank 5, and the bank 0 and bank 1 have the interleave construction.

Figure 1:
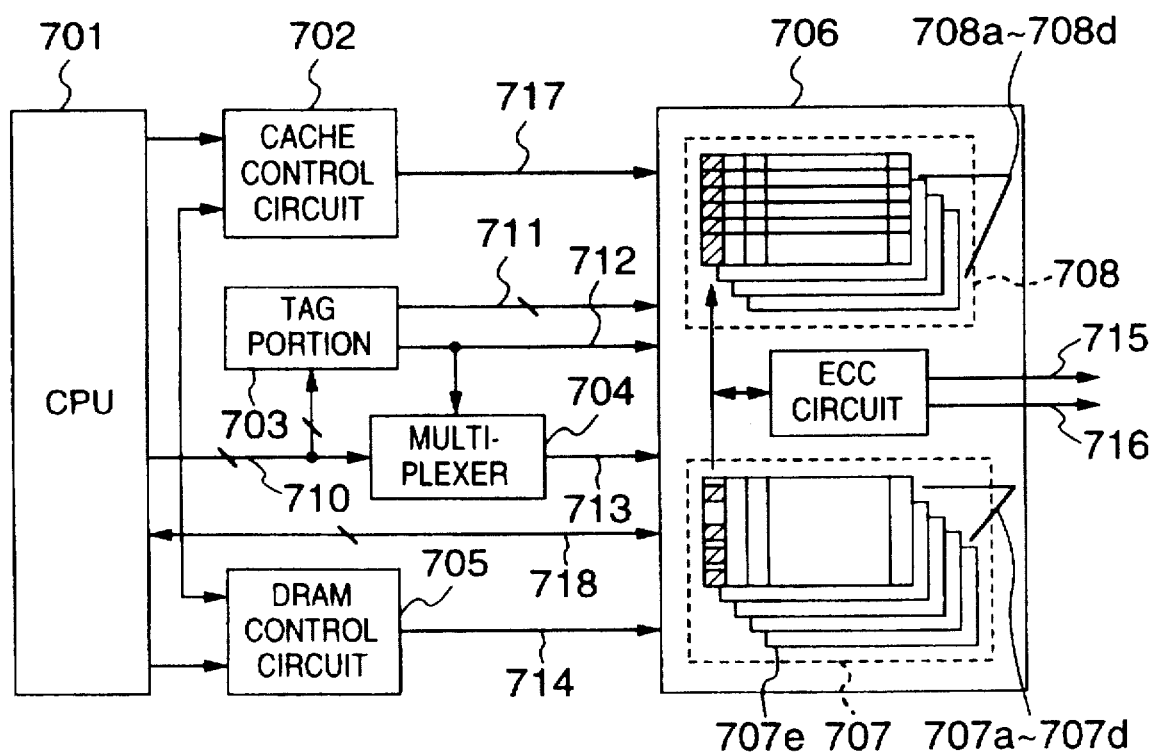
FIG. 1 is a block diagram showing a schematic construction of a conventional semiconductor memory apparatus having therein a cache memory.
Figure 2:
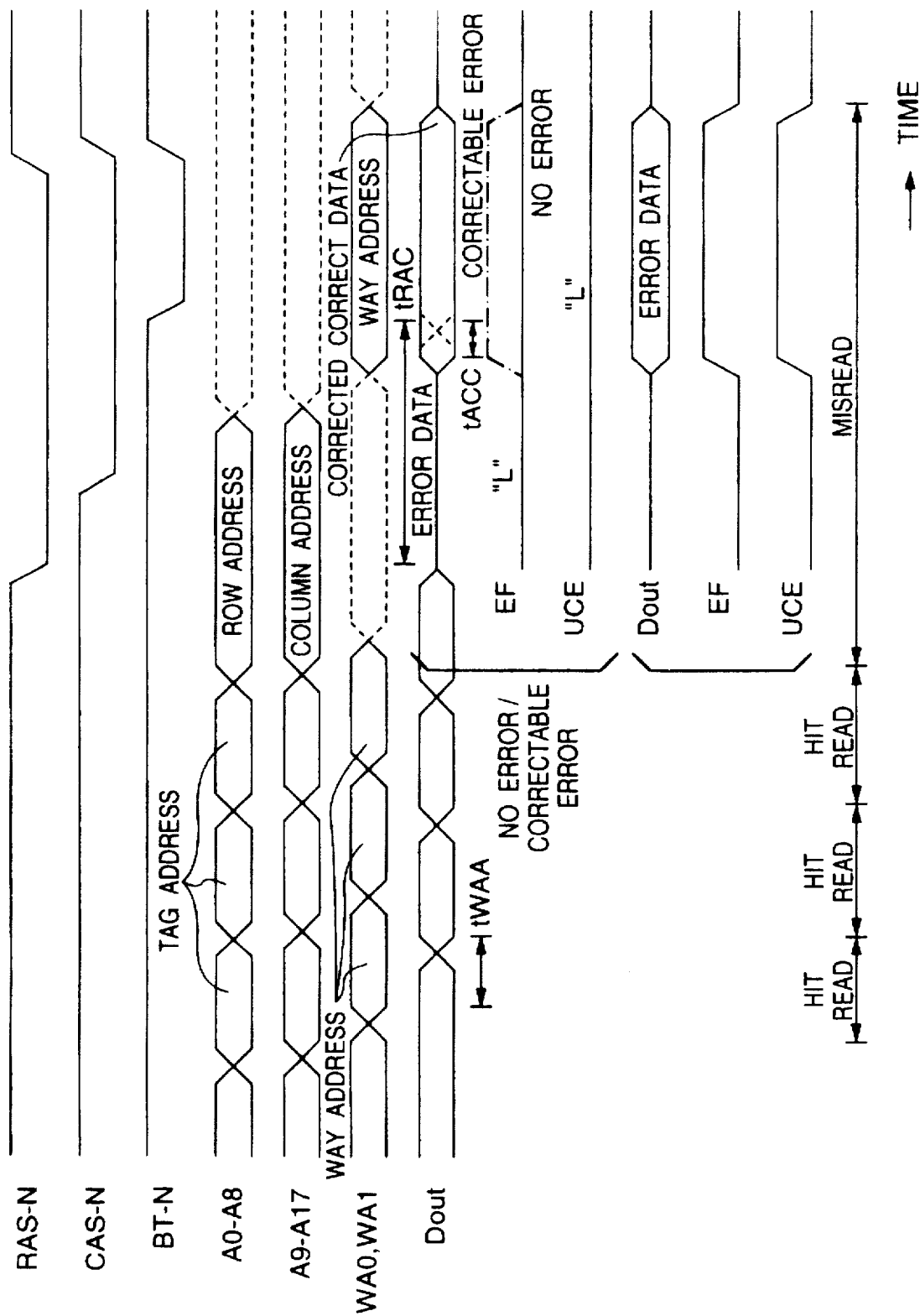
FIG. 2 is a timing chart for explaining the operation of the conventional semiconductor memory apparatus shown in FIG. 1.

When a power source of the information processing apparatus in FIG. 1 is turned on, the CPU 101 receives the ID code from the memory module inserted in each slot on the mother board through the main memory control circuit 119 and signal line 123 and the CPU recognizes the memory type of each memory module (step 750). It is now assumed that 256 kB (kilobytes) is recognized as a memory type of each memory module.

Subsequently, the construction of the main memory, namely, bank construction is determined from the memory type of each memory module (step 752). Namely, it is recognized that the bank A is constructed by the bank 0, the bank B is constructed by the banks 1 to 5, and the banks 0 and 1 have the interleave construction. The CPU 101 sends data to the cache mapping register 201 through the signal line 124 and respectively sets "0", "0", "0", and "1" to bits b3, b2, b1, and b0 of such a register in accordance with the recognition result in step 752 (step 754). Namely, data shown in b) in FIG. 6 is set.

The setting method by the software will now be described with reference to a flowchart of FIG. 8 and FIG. 9. Such a setting method by the software has been disclosed in, for example, JP-A-6-224516. First, when the power source of the information processing apparatus is turned on, the CPU 101 receives the ID code from the memory module inserted into each slot on the mother board through the main memory control circuit 119. The CPU recognizes the memory construction (bank construction) of each memory module (step 800). Namely, it is recognized that the bank A is constructed by the bank 0 and the bank B is constructed by the banks 1 to 5. Subsequently, the value which differs every predetermined capacity is written into the memory module inserted into each slot (step 802). That is, for example, for each memory module, "1111" is written into the area of 0 kB to 256 kB, "2222" is written into an area of 256 kB to 512 kB, "3333" is written into an area of 512 kB to 768 kB, "4444" is written into an area of 768 kB to 1024 kB, and "5555" is written into an area of 1024 kB to 1280 kB, respectively.

Subsequently, all of the values written into the memory module inserted into each slot are read out (step 804). In this case, "5555" is read out with regard to the bank A (namely, bank 0). On the other hand, as for the bank B (namely, banks 1 to 5), "1111" is read out with respect to the bank 1, "2222" is read out with respect to the bank 2, "3333" is read out with respect to the bank 3, "4444" is read out with respect to the bank 4, and "5555" is read out with respect to the bank 5, respectively. The memory type is recognized on the basis of the values read out as mentioned above. Namely, it is recognized that the bank 0 of the bank A is set to 256 kB and each of the banks 1 to 5 of the bank B is likewise set to 256 kB.

On the basis of the memory construction recognized in step 800 and the memory type read out in step 804, the CPU 101 recognizes that the bank A is constructed by the bank 0, the bank B is constructed by the banks 1 to 5, and the banks 0 and 1 have the interleave construction. Therefore, from the recognition result, "0", "0", "0", and "1" are set into bits b3, b2, b1, and b0 of the cache mapping register 201, respectively (step 806).

The processes in steps 802 and 804 will now be described by using FIG. 9.

In the present products, since a possibility such that three kinds of memory modules of 2 MB (megabytes), 4 MB, and 8 MB are generally used as memory modules is high, explanation will now be made with respect to such a case. In this case, three kinds of test data are prepared and it is assumed that they are, for example, (22222222), (44444444), and (88888888).

As addresses to be set, "A" (1FFFFF) (hexadecimal notation; the same shall also apply hereinbelow) corresponding to 2 MB, "B" (2FFFFF) corresponding to 4 MB, and "C" (4FFFFF) corresponding to 8 MB have been prepared.

The address A is allocated to the test data (22222222), the address B is allocated to the test data (44444444), and address C is allocated to the test data (88888888), respectively, and they are written into the memory modules.

Figure 9:
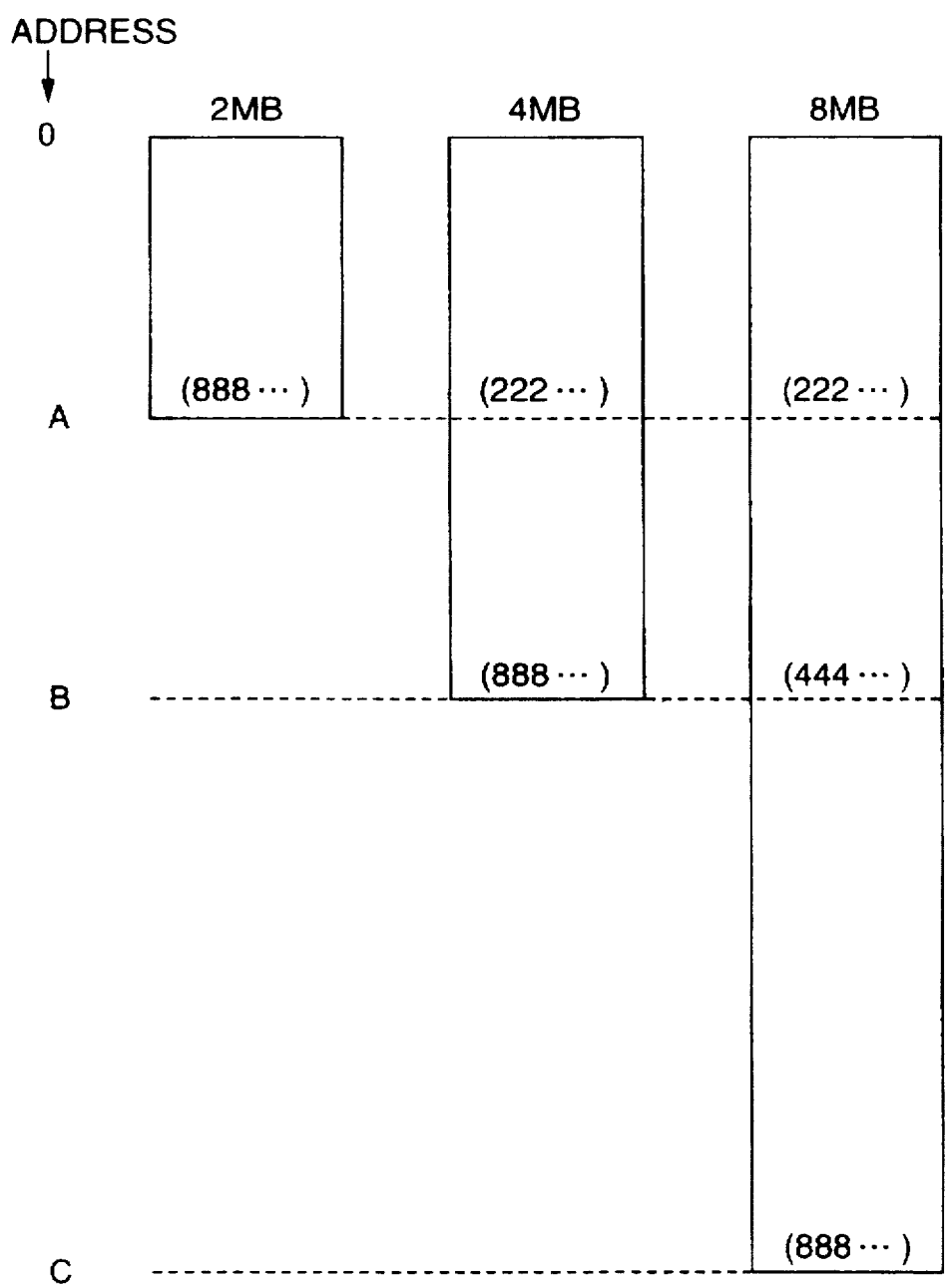
FIG. 9 is a diagram for explaining a method of setting data into the cache mapping register in FIG. 8 by software.

FIG. 9 shows a state in which the test data was written into the memory modules of 2 MB, 4 MB, and 8 MB.

When the test data is written, in the memory module of 8 MB, the test data (222 . . . ) is written into the address A, (444 . . . ) is written into B, and (888 . . . ) is written into C, respectively. However, in the memory module of 4 MB, when the writing process is performed to the address C, after the memory address (200000), the address is returned to the address (000000) of 4 MB and the addresses are added, so that the test data (888 . . . ) is written into the address B. Similarly, a state such that after (222 . . . ) was written to the location of the address A of the memory module of 2 MB, (444 . . . ) is written and (888 . . . ) is further overwritten is obtained.

After completion of the writing operation of each data, the written data is first read out from the address A. The contents of the read-out data (read data) are checked. When the contents of the read data are (88888888), it is determined that the memory module has a capacity of 2 MB.

When the data in the address A is (22222222), the data in the address B is read out and its contents are checked. When the data in the address B is (88888888), it is possible to recognize that the memory module has a capacity of 4 MB. When the read data in the address B is (44444444), it is determined that the memory module has a capacity of 8 MB.

By performing such a check every memory slot, the capacities of the memory modules in all of the memory slots can be checked.

The operation of the cache memory control circuit 103 in case of various constructions of the main memory will now be described.

Figure 10:
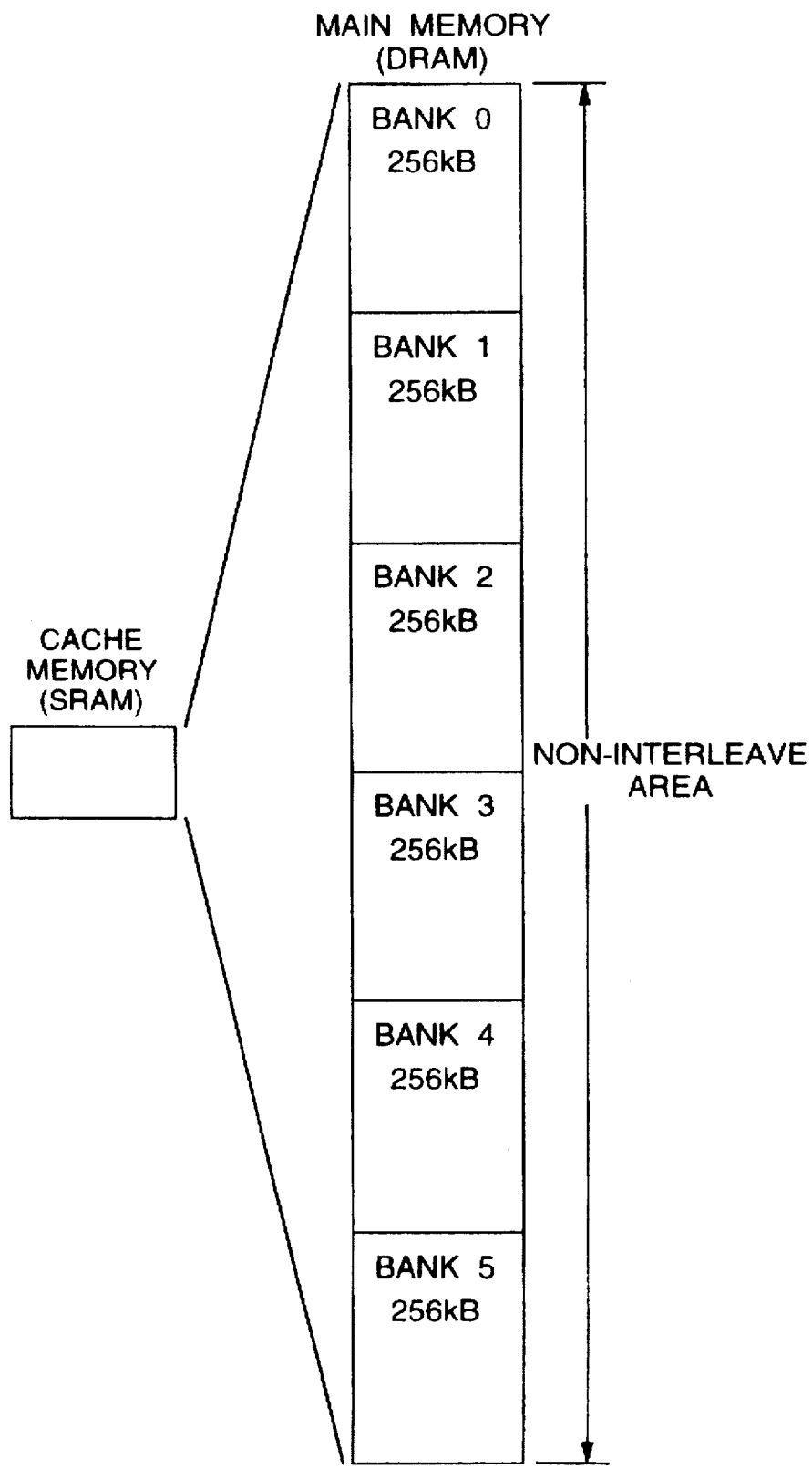
FIG. 10 is an address mapping diagram of the cache memory when the main memory has a first memory construction.

First, the operation in case of the non-interleave construction as shown in FIG. 10 will now be described as a first memory construction. In this case, in FIG. 6, both of bits b1 and b0 in the cache mapping register are equal to "0" (low level), there is no identification address, and the mapping of the cache is performed from the head address (0 MB~). As for the operation, in FIG. 4, at the time of the activation of the system, the memory construction is first discriminated by the above method and both of bits b1 and b0 in the cache mapping register 201 are set to "0". In association with it, an output of the AND gate 202 is set to a valid state "1" (high level), thereby making the mapping signal 105 valid through the OR gate 208. In this case, since the CPU address 102 is not concerned with the conditions for validating the mapping signal 105, the DRAMs 102 of all of the banks are set to cache targets.

The operation in case of the non-interleave construction will now be described in more detail.

When a power source of the information processing apparatus is turned on, the CPU 101 first determines the memory type and memory construction as mentioned above and sets "0" into all of bits b3 to b0 in the cache mapping register 201. Namely, the above case corresponds to a case of a) in FIG. 6.

Since both of b1 and b0 in the cache mapping register 201 are equal to "0", outputs of the AND circuit 202 and OR circuit 208 are set to the high ("H") level. The output of the OR circuit 208 is the mapping signal 105 in FIG. 1. Since the mapping signal 105 is at the "H" level, the chip selection signal (CS1-N) of the cache data SRAM 110 and the chip selection signal (CS2-N) of the cache tag SRAM 111 are controlled by the chip selection signals (CS1) 112 and (CS2) 113 which are outputted from the cache control circuit 103. Now, (CS1) 112 and (CS2) 113 denote the chip selection signals for the cache memory in the prior art. All of the main memories (DRAMs) 120 installed are accessed irrespective of the memory construction. Further, the mapping signal 105 is inputted to the AND gate 108 together with the determination signal 1 (107) (this signal is a signal indicative of hit/miss of the cache and is set to the "H" level at the time of hit) of the address comparing circuit 106. The determination signal 2 (109) is outputted. Since the mapping signal 105 is at the "H" level here, the determination signal 2 (109) reflects the state of the determination signal 1 (107). In case of the cache hit, therefore, the determination signal 2 (109) is set to the "H" level and disables the control of the memory control circuit 119 and doesn't perform the access to the main memory (DRAM) 120 by the DRAM control signal 121. On the contrary, in case of the cache miss, the determination signal 2 (109) is set to the "L" level, enables the control of the memory control circuit 119, and performs the access to the main memory (DRAM) 120. In case of the embodiment, since the mapping signal 105 is set to the "H" level irrespective of the state of the CPU address 102, in FIG. 6, there is no identification address by the CPU address 102, all of the main memories (DRAMs) 120 become the targets of the cache, and the cache start address starts from the head address (0 MB~).

Figure 15:
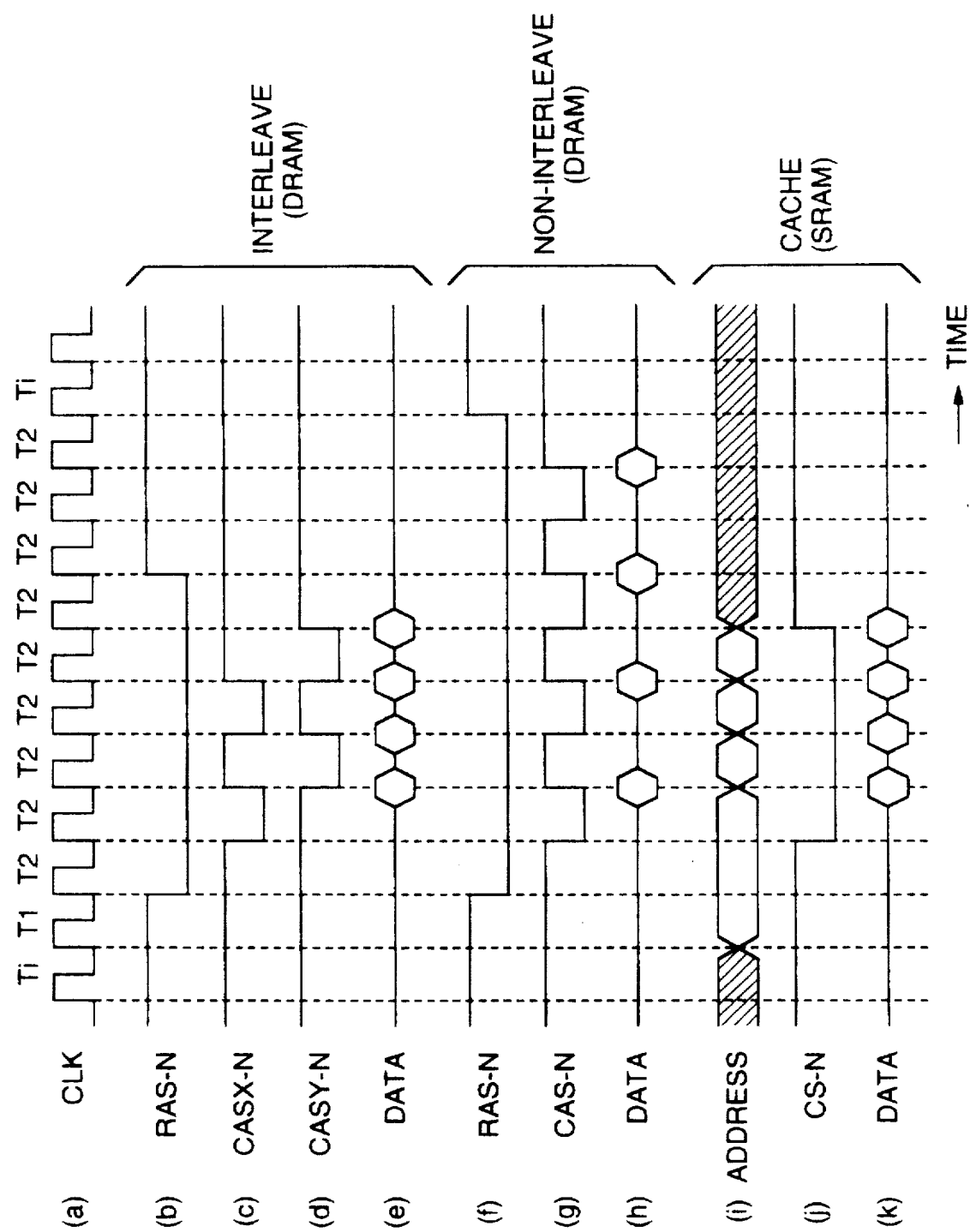
FIG. 15 is a timing chart for explaining the operation of a cache mapping control circuit in FIG. 3.

FIG. 10 is a mapping diagram of the cache memory in the first memory construction. FIG. 15 is a timing chart for explaining the operation of the cache mapping control circuit 103. As will be obviously understood from a) and f) to h) in FIG. 15, when reading/writing data, in case of the non-interleave construction, two clock cycles (as many as two periods of a clock CLK) are necessary per bank. Therefore, 12 CLK cycles are needed as the number of burst cycles for the DRAMs 120 of all of the banks (banks 0 to 5). On the other hand, in case of the cache hit, as will be obviously understood from a) and i) to k) in FIG. 15, since it is sufficient to use one CLK cycle per bank, it is sufficient to use 6 CLK cycles as the number of burst cycles for the DRAMs 120 of all of the banks (banks 0 to 5).

Figure 12:
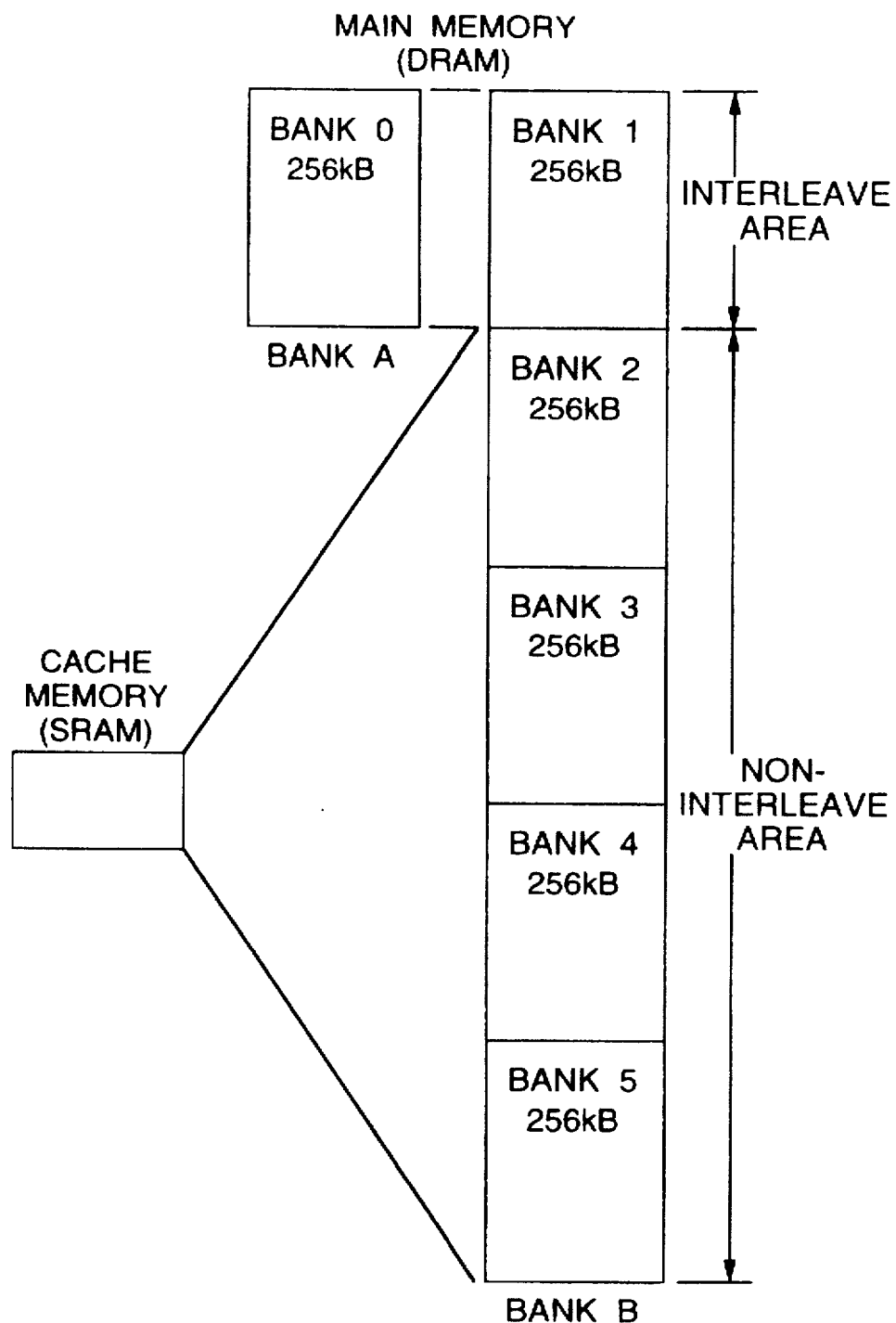
FIG. 12 is an address mapping diagram of the cache memory when the main memory has a second memory construction.

As a second memory construction, the operation when only the banks 0 and 1 have the interleave construction and the other banks have the non-interleave construction as shown in FIG. 12 will now be described. In this case, in FIG. 6, the bits in the cache mapping register are equal to "0, 0, 0, 1" from the upper bits. A19 and A20 in the CPU address 102 are used as identification addresses, and the mapping of the cache is executed from 512 kB. In the operation in this case, in FIG. 4, the memory construction is determined at the time of the activation of the system and the bits in the cache mapping register 201 are set to "0, 0, 0, 1" from the upper bits. In association with it, an output of the AND gate 203 is set into a valid state "1" so long as either one of A19 and A20 in the CPU address 102 is equal to "1", thereby validating the mapping signal 105 through the OR gate 208. In this case, when either one of A19 and A20 in the CPU address 102 is equal to "1", the cache control is made valid, so that the DRAMs 102 after the bank 2 are set to the cache targets.

The operation in case of the second memory construction will now be described in more detail.

First, when the power source of the information processing apparatus is turned on, the CPU 101 determines the memory type and memory construction as mentioned above and sets (0,0,0,1) into bits b3, b2, b1, and b0 in the cache mapping register 201. Namely, the above case corresponds to a case of b) in FIG. 6.

Since b1 and b0 in the cache mapping register 201 are equal to (0,1), all of outputs of the AND circuits 202 and 204 to 207 other than the AND circuit 203 are set to the "L" level. Only when the state of the CPU address 102 in FIG. 1 is reflected and the address in which A19 or A20 is set to "1" is outputted, the outputs of the AND circuit 203 and OR circuit 208 are set to the "H" level. As mentioned above, since the output of the OR circuit 208 is the mapping signal 105 in FIG. 3, when A19 or A20 in the CPU address 102 is equal to "1" |in FIG. 12, the case where the bank 2 and subsequent banks (non-interleave areas) are accessed|, the mapping signal 105 is set to the "H" level and this state is the same as the control for FIG. 10 (cache target). On the contrary, when both of A19 and A20 are equal to "0" |in FIG. 12, the case where the banks 0 and 1 (interleave areas) are accessed), the mapping signal 105 is set to the "L" level. Therefore, the chip selection signals (CS1-N, CS2-N) of the cache data SRAM 110 and cache tag SRAM 111 are always set into a disable state ("H" level) irrespective of the states of the chip selection signals (CS1) 112 and (CS2) 113 which are outputted by the cache control circuit 103. The cache memory is not accessed (the interleave areas are set to the areas out of the cache targets). Further, since the determination signal 2 (109) is set to the "L" level irrespective of the state of the determination signal 1 (107) by the address comparing circuit 106, the control of the main memory control circuit 119 is enabled and the main memory (DRAM) 120 is accessed [namely, in the interleave area, the cache is out of the target and the main memory (DRAM) 120 is accessed at a high speed by the interleave control]. In case of the embodiment, as for the state of the CPU address 102, when either one of A19 and A20 is equal to "1", the mapping signal 105 is set to the "H" level. Therefore, in FIG. 6, the identification address by the CPU address 102 is set to A19 and A20, the main memories (DRAMs) 120 of the bank 2 and subsequent banks become the cache targets, and the cache start address starts from 512 kB.

In case of the second memory construction, in the operation timing chart shown in FIG. 15, in the interleave construction of the banks 0 and 1, independent column address strobe signals (CASX-N, CASY-N) are given to those banks. Therefore, in the banks 0 and 1, since the access can be performed by using the mutual precharging periods, the number of burst cycles is equal to 6 CLK cycles [low-level period of RAS-N in (b) in FIG. 15] and the process can be executed by the same number of cycles as the number of cycles by the cache [refer to (a) to (e) in FIG. 15].

Namely, even if the cache mapping is performed to the DRAM 102 with the interleave construction, there is no reducing effect of the processing time. Therefore, the bank 2 and subsequent banks of the DRAM 102 with the non-interleave construction are set to the cache targets by the CPU address (A19, A20) 102 as an identification address, the reduction of the processing time is realized in the cache hit cycle.

As a third memory construction, the operation in the case where the banks 0 and 1 and the banks 2 and 3 have the interleave construction and the other banks have the non-interleave construction [the case of c) in FIG. 6] will now be described. This case is similar to the case where only the banks 0 and 1 have the interleave construction as mentioned above. The bank 4 and subsequent banks of the DRAM 102 having the non-interleave construction are set to the cache targets by the CPU address (A19, A20) 102 as an identification address, thereby realizing a reduction of the processing time in the cache hit cycle.

As a fourth memory construction, the operation in the case where all of the DRAMS 102 have the interleave construction like banks 0 and 1, banks 2 and 3, and banks 4 and 5 [the case of d) in FIG. 6] will now be described. In this case, in FIG. 6, both of bits 1 and 0 in the cache mapping register are equal to "1", there is no identification address, and the mapping of the cache is executed from the head address (0 MB~). As for the operation, in FIG. 4, the memory construction is determined at the time of the system activation and both of bits 1 and 0 in the cache mapping register 201 are set to "1". In association with it, an output of the AND gate 207 is set to a valid state, thereby validating the mapping signal 105 through the OR gate 208. In this case, since the CPU address 102 is not concerned with the conditions for validating the mapping signal 105, the DRAMs 102 of all of the banks with the interleave construction are set to the cache targets.

In the fourth memory construction, as will be obviously understood from the operation timing chart shown in FIG. 15, since the number of burst cycles of the DRAM with the interleave construction and the number of burst cycles of the cache SRAM are set to 6 CLK cycles and are equal, the reduction of the processing time by the cache memory when all of the DRAMs 102 have the interleave construction is not recognized.

As mentioned above, by setting the cache targets for the areas with the non-interleave construction in the main memory, the access processing time of the whole main memory can be reduced.

The embodiment can be also applied to a nonbank construction as shown in FIG. 11A, namely, to a main memory constructed by a single bank. In such a case, set data of bits b3, b2, b1, and b0 in the cache mapping register 201 is set to (0,0,0,0) and the whole area in the main memory is set to the cache target. Therefore, the cache start address is set to 0 MB.

In case of the non-bank construction, as shown in FIG. 11B, a partial area in the main memory, for example, the area of 512 kB or more can be selectively set to the cache target. In such a case, the set data of bits b3, b2, b1, and b0 in the cache mapping register 201 is set to (0,0,0,1) and the cache start address is set to 512 kB.

Figure 13:
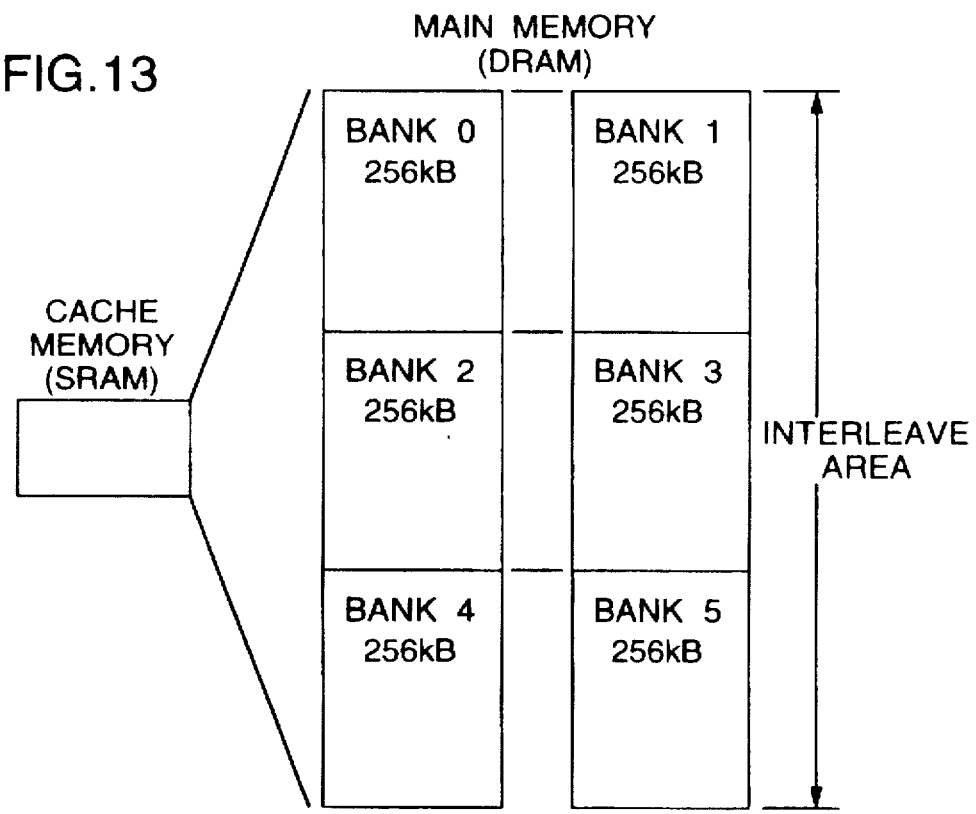
FIG. 13 is an address mapping diagram of the cache memory when the main memory has a fourth memory construction.
Figure 14:
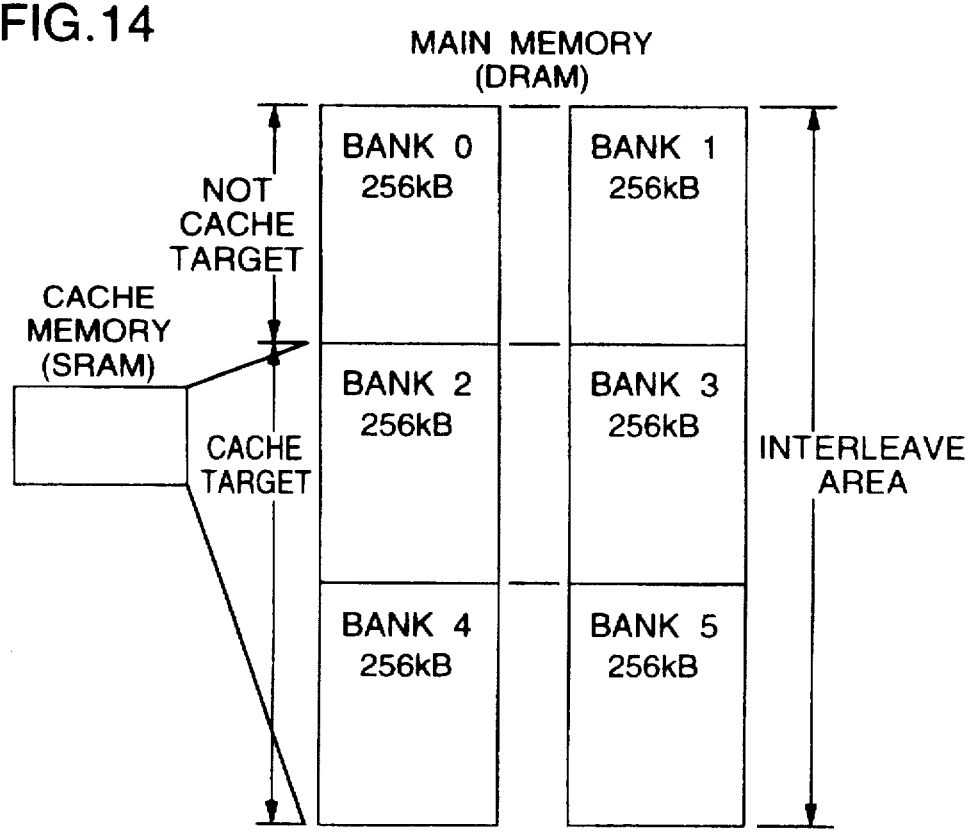
FIG. 14 is a diagram showing another example of an address mapping of the cache memory when the main memory has a fourth memory construction.

As shown in FIG. 13, when the entire main memory has the interleave construction, a partial area can be also set to the cache target as shown in FIG. 14. For example, the area of the bank 2 or more can be also set to the cache target. In this case, the set data of bits b3, b2, b1, and b0 in the cache mapping register 201 is set to (0,0,0,1) and the cache start address is set to 512 kB.

When using a write back control system as a writing system of the cache memory, as in the embodiment, by limiting the area which is set to the cache target in the whole area in the main memory, cache address information to be stored in the cache tag SRAM 111 can be reduced as compared with that in the prior art. Namely, in the prior art, the whole area in the main memory is generally set to the cache target. Therefore, the address information to be stored in the cache tag SRAM 111 is needed from the most significant bit in correspondence to the capacity of the main memory. In the embodiment, on the other hand, the upper CPU address is compared with the set data in the cache mapping register 201, thereby determining the area in the main memory serving as a cache target. Therefore, since there is an address area in the main memory which doesn't become the cache target, the address information corresponding to such an area can be deleted from the cache tag SRAM 111 and the address information can be reduced than that in the prior art.

Therefore, since the address information to be stored in the cache tag SRAM 111 is reduced as mentioned above, information [dirty bit (D)] to realize a high processing speed, information [valid bit (V)] to indicate a validity of the data in the cache memory, and the like are added to the cache address information and can be stored into the cache tag SRAM.

The dirty bit (D) indicates whether the data in the data SRAM 110 and main memory DRAM 120 in the same address are identical or not, namely, whether the valid data which doesn't coincide with that in the main memory exists in the cache memory or not. The valid bit (V) indicates whether all of the data in each line in the data SRAM 110 is valid or not, namely, whether all of the block data of every four double words in the cache memory is valid or not.

When the data in the cache data SRAM 110 is updated, the information D and V is written into the cache tag SRAM 111 by the cache control circuit 103 together with an upper memory address (tag address).

FIG. 16 shows a list of tag address set values when the cache control circuit 103 is valid and when it is invalid according to the embodiment. Namely, when the cache control circuit 103 is valid and when it is invalid, in the case where the capacity (cache size) of the cache data SRAM 110 is fixed (for example, 128 kB) and the capacity (main size) of the main memory (DRAM) 120 is set within a range of 8 MB to 64 MB, the relation between the capacity (cache target main memory size) of the main memory 120 serving as a cache target and the list (Tag0 to Tag8) of information which can be stored into the cache tag SRAM 111 is shown. When the cache control circuit 103 is valid, explanation will now be made on the assumption that, for example, the half area in the main memory becomes the cache target.

In FIG. 16, when the size of main memory is equal to 8 MB and the cache mapping control circuit 103 in the embodiment is invalid, the cache target is set to 8 MB of the whole area in the main memory. Therefore, the tag addresses Tag6 to Tag8 become empty and the information D and V can be added to Tag6 and Tag7. In FIG. 16, X denotes that there is no information. When the cache mapping control circuit 103 is valid, the cache target is set to 4 MB as a half area in the main memory. Therefore, tag addresses Tag5 to Tag8 become empty and the information D and V can be added to Tag5 and Tag6.

Similarly, when the size of main memory is equal to 16 MB and the cache mapping control circuit 103 in the embodiment is invalid, the cache target is set to 16 MB as a whole area in the main memory, so that the tag addresses Tag7 and Tag8 become empty and the information D and V can be added to Tag7 and Tag8. On the other hand, when the cache mapping control circuit 103 is valid, the cache target is set to 8 MB as a half area in the main memory. Therefore, the tag addresses Tag6 to Tag8 become empty and the information D and V can be added to Tag6 and Tag7. As mentioned above, in case of a) and b) in FIG. 16, the information D and V can be added in any cases where the cache mapping control circuit 103 in the embodiment is valid and where it is invalid.

On the other hand, when the size of main memory is equal to 32 MB and the cache mapping control circuit 103 in the embodiment is invalid, the cache target is set to 32 MB in the whole area in the main memory, so that only the tag address Tag8 becomes empty and only one of the information D and V can be added. When the cache mapping control circuit 103 is valid, the cache target is set to 16 MB as a half area in the main memory, so that the tag addresses Tag7 and Tag8 become empty and the information D and V can be added.

When the size of main memory is equal to 64 MB and the cache mapping control circuit 103 in the embodiment is invalid, the cache target is set to 64 MB of the whole area in the main memory, so that there is no empty in the tag address and none of the information D and V can be added. When the cache mapping control circuit 103 is valid, the cache target is set to 32 MB as a half area in the main memory, so that the tag address Tag8 becomes empty and one of the information D and V can be added.

In case of c) and d) in FIG. 16, therefore, when the cache mapping control circuit 103 in the embodiment is valid, as compared with the case where it is invalid, the high accessing speed can be realized and/or the consistency of the data can be assured.

As described above, according to the embodiment, the following effects can be obtained.

(1) In accordance with the kind and construction of the DRAM as a main memory, the SRAM as a cache memory is preferentially allocated to the main memory area with the low speed access construction, so that a redundancy circuit can be eliminated with respect to the accessing performance of the main memory and the high speed access can be realized.

(2) By limiting the area in the main memory serving as a cache target to the low speed area with the non-interleave construction, the D (dirty) and V (valid) information can be added into the tag SRAM. In addition to the above item (1), a further high accessing speed and consistency of the data can be assured.

(3) For the portion in which the DRAM as a main memory has a construction such that it can be accessed at a high speed, the allocating order of the SRAM as a cache memory is reduced, so that the cache memory larger than that it is needed is not installed and a miniaturization of the system can be realized.

(4) Further, since the number of high speed and expensive SRAMs as cache memories which are installed is suppressed by the above item (3), a saving of an electric power consumption and a reduction of costs can be realized.

Figure 17:
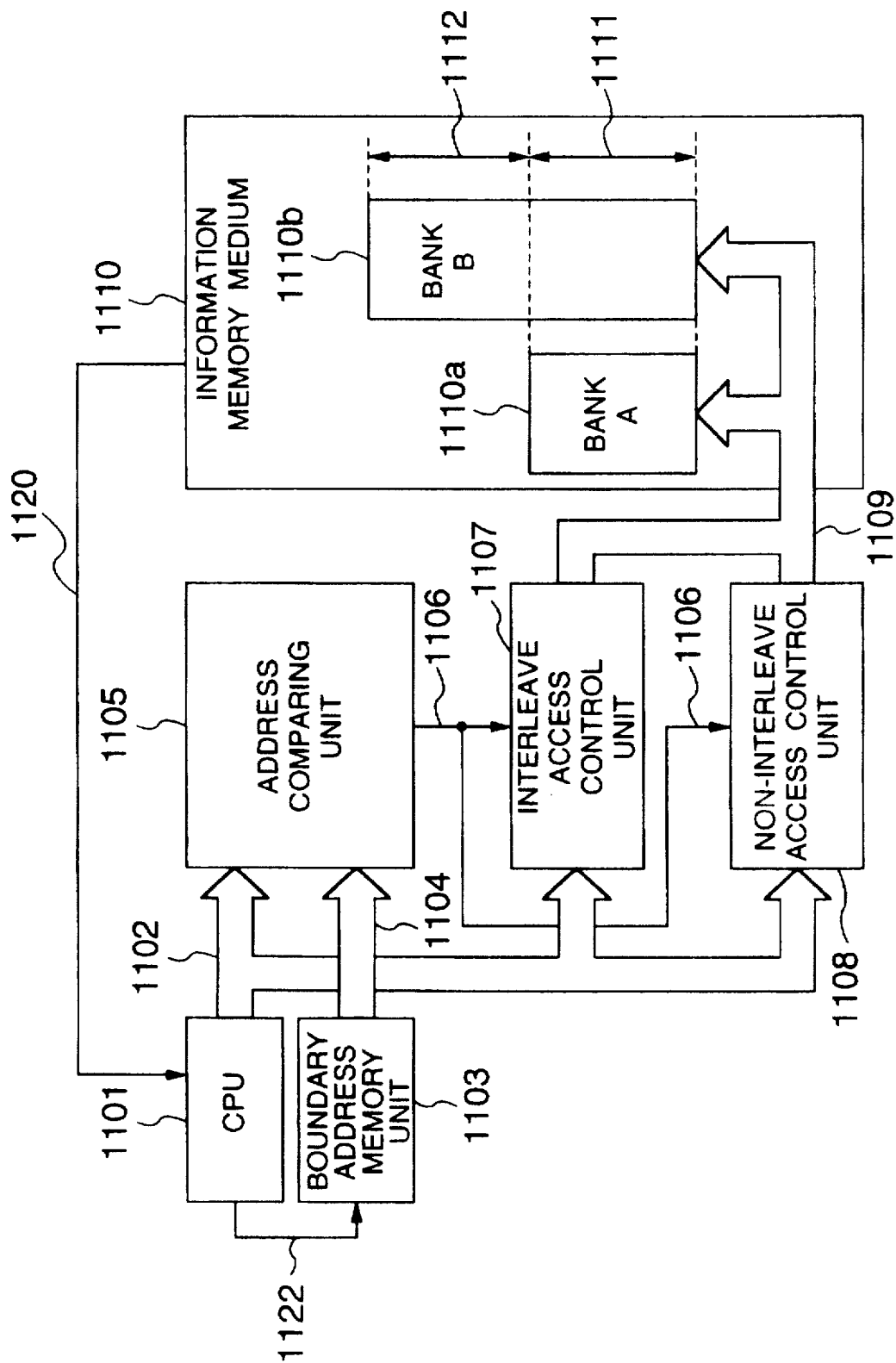
FIG. 17 is a block diagram showing a schematic construction of an information processing apparatus to which an embodiment of control method and apparatus of a memory capable of interleave control according to the invention is applied.

An embodiment of control method and apparatus of a memory capable of interleave control according to the invention will now be described. FIG. 17 is a block diagram showing a schematic construction of an information processing apparatus to which the embodiment is applied. In all of the drawings, portions having the same functions are designated by the same reference numerals and their overlapped description is omitted.

In the following embodiment, for example, memory control method and apparatus for performing an interleave access or non-interleave access by using one SIMM of 1 Mbytes and one SIMM of 4 Mbytes will be described.

In FIG. 17, reference numeral 1101 denotes a central processing apparatus (hereinafter, referred to as a CPU); 1102 a CPU address as an address to access, for example, a local bus address which is outputted from the CPU 1101; 1103 a boundary address memory unit; 1104 a boundary address which is outputted from the boundary address memory unit 1103; 1105 an address comparing unit; 1106 a comparison result signal; 1107 an interleave access control unit; 1108 a non-interleave access control unit; and 1109 a memory address which is outputted from the interleave access control unit 1107 or non-interleave access control unit 1108.

In FIG. 17, reference numeral 1110 denotes an information memory medium; 1110a a bank A as a part of the information memory medium 1110; 1110b a bank B as a part of the information memory medium 1110 different from the bank A 1110a; 1111 an interleave access area (area which can be interleave accessed); and 1112 a non-interleave access area (area which cannot be interleave accessed).

As shown in FIG. 17, the embodiment has: the CPU 1101; the boundary address memory unit 1103 to store the boundary address 1104 between the interleave access area 1111 and non-interleave access area 1112; the address comparing unit 1105 for comparing the local bus address 1102 with the boundary address 1104; the interleave access control unit 1107 to perform the interleave access; the non-interleave access control unit 1108 to perform the non-interleave access; and the information memory medium 1110.

The information memory medium 1110 in the embodiment has the banks A 1110a and B 1110b having different memory capacities. The memory capacity of the bank B 1110b is larger than that of the bank A 1110a and the interleave access area 1111 and non-interleave access area 1112 are formed in the bank B.

As shown in FIG. 17, in the embodiment, the local bus address 1102 which is outputted from the CPU 1101 and the boundary address 1104 which is outputted from the boundary address memory unit 1103 are supplied to the address comparing unit 1105. The address comparing unit 1105 compares the local bus address 1102 with the boundary address 1104 and outputs the result as a comparison result signal 1106.

In the embodiment, a local bus address 1102 which is outputted from the CPU 1101 is also supplied to the interleave access control unit 1107 and non-interleave access control unit 1108. Either one of the interleave access control unit 1107 and non-interleave access control unit 1108 is validated or the other is invalidated by the comparison result signal 1106 which is outputted from the address comparing unit 1105. The validated one of those control units generates the memory address 1109.

In the embodiment, the memory address 1109 which is outputted when the interleave access control unit 1107 is validated is inputted to the bank A 1110a and bank B 1110b and an interleave access between the banks of different memory capacities is executed in the interleave access area 1111.

In the embodiment, the memory address 1109 which is outputted when the non-interleave access control unit 1108 is validated is inputted to the bank B 1110b and a non-interleave access is executed in the non-interleave access area 1112.

An outline of the memory access in the embodiment will now be described hereinbelow.

In the embodiment, the CPU 1101 requests a memory access to the information memory medium 1110 and outputs the local bus address 1102 of n bits. The boundary address memory unit 1103 outputs the boundary address 1104 of n bits which has previously been stored to the address comparing unit 1105.

When the local bus address 1102 outputted by the CPU 1101 and the boundary address 1104 outputted from the boundary address memory unit 1103 are inputted to the address comparing unit 1105, magnitudes of the local bus address 1102 and boundary address 1104 are compared in the address comparing unit 1105.

The address comparing unit 1105 outputs the comparison result as a comparison result signal 1106 to the interleave access control unit 1107 and non-interleave access control unit 1108. Either one of the interleave access control unit 1107 and non-interleave access control unit 1108 is selected by the comparison result signal 1106 and made valid and the other is made invalid.

Namely, the address comparing unit 1105 determines in which one of the interleave access area 1111 and non-interleave access area 1112 the local bus address 1102 is included.

On the basis of the determination result, the corresponding interleave access control unit 1107 or non-interleave access control unit 1108 in each area is made valid, so that the interleave access can be performed by using the bank memories of different memory capacities by using the boundary address 1104 as a boundary.

Figure 22:
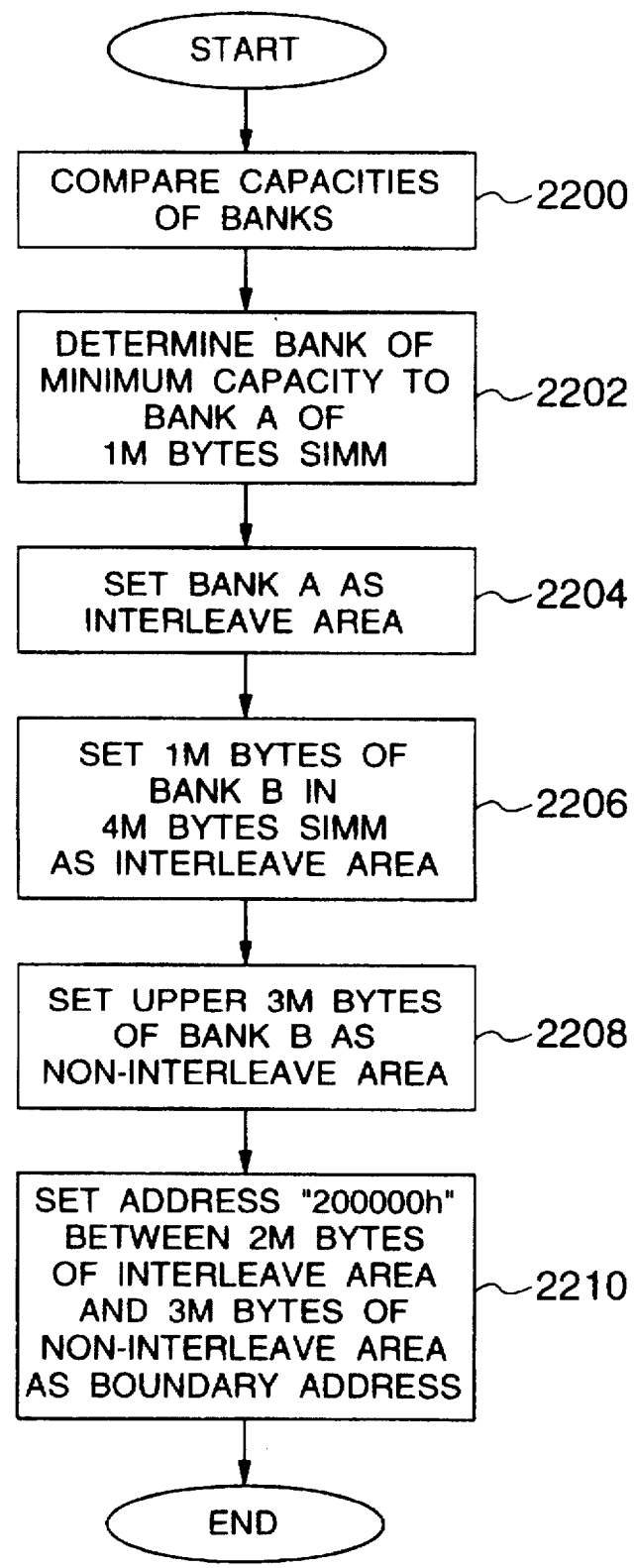
FIG. 22 is a flowchart for explaining a setting method of a boundary address of the information memory medium with the construction of FIG. 21.

A setting method of the boundary address in the embodiment will now be described by using a flowchart of FIG. 18. The CPU 1101 executes processes in FIG. 18 and FIG. 22, which will be explained hereinlater, in accordance with programs provided therein.

First, the CPU 1101 recognizes memory capacities of the banks A and B on the basis of the data from the information memory medium 1110 transmitted through a signal line 1120 from the banks A and B by a method similar to the method described in FIG. 7 or 8 in the foregoing embodiment. Further, on the basis of the recognized memory capacities of the banks A and B, the whole memory area 1111 of the bank having the smallest memory capacity (bank A in the example of FIG. 17) is set as an interleave access area (namely, area as an interleave access target) (step 1800).

Subsequently, the memory area 1111 of the same capacity as that of the bank having the smallest memory capacity (bank A here) in the whole memory area of the other bank (bank B here) is set to an interleave access area and the other area 1112 is set as a non-interleave access area (step 1802).

Subsequently, the CPU 1101 stores the address indicative of the boundary between the interleave access area 1111 and non-interleave access area 1112 of the bank B as a boundary address into the boundary address memory unit 1103 through a signal line 1122 (step 1804).

Figure 18:
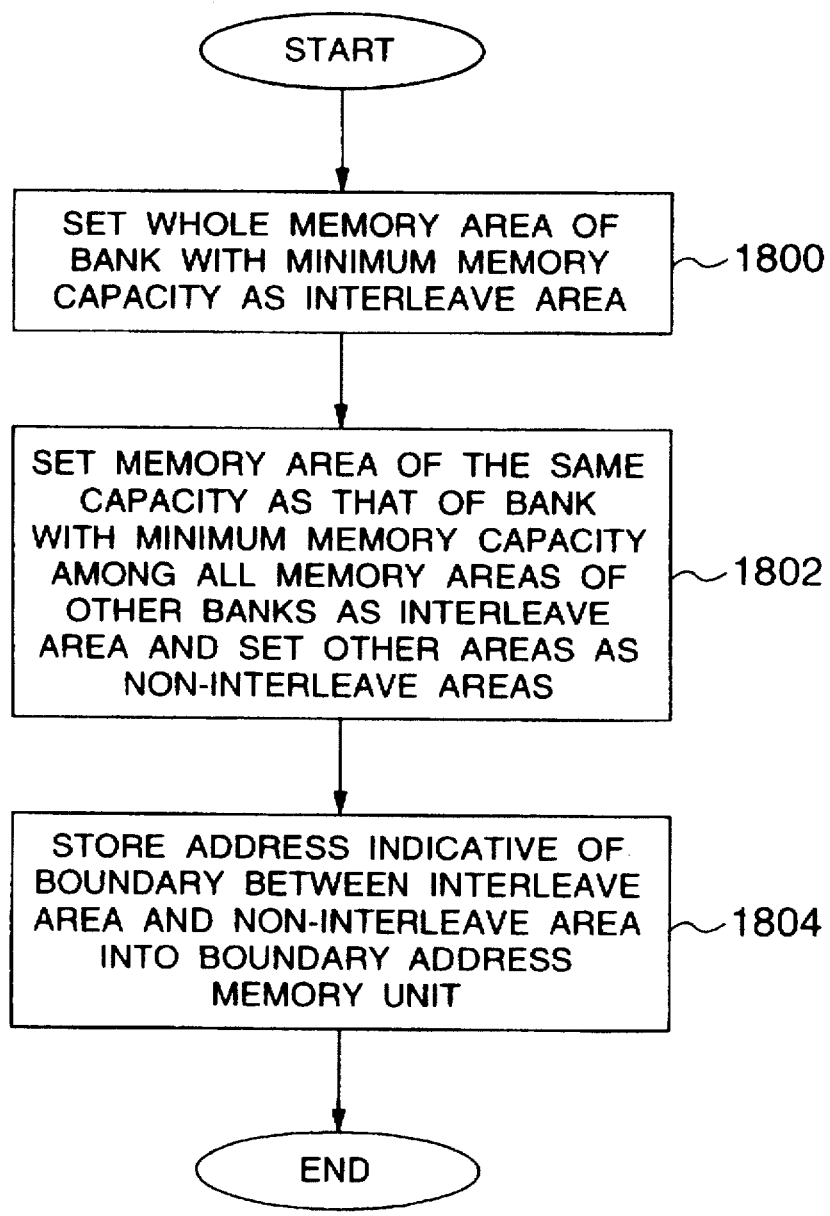
FIG. 18 is a flowchart for explaining a setting method of a boundary address of an information memory medium in the embodiment of FIG. 17.

Although the case of the embodiment of FIG. 17 is a case where there are two banks (banks A and B) of the information memory medium 1110, the processes of FIG. 18 can be also applied to a case where there are three or more banks.

In the embodiment, the operation of the address comparing unit 1105 in case of performing an interleave access when the local bus address 1102 is smaller than the boundary address 1104 will now be described hereinbelow.

Figure 19:
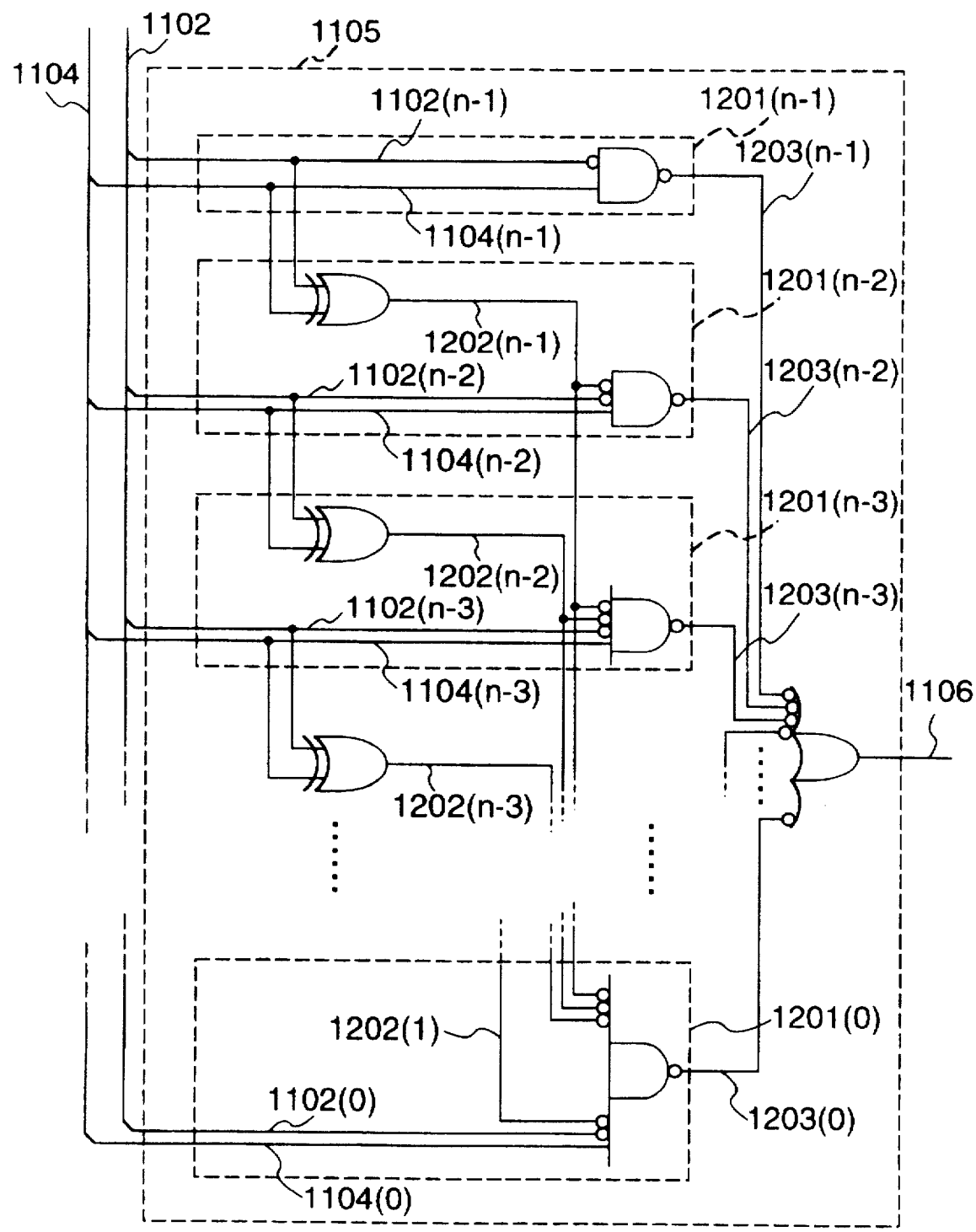
FIG. 19 is a logic circuit diagram showing an example of a construction of an address comparing unit in the embodiment of FIG. 17.

FIG. 19 is a diagram showing an outline of a logic circuit of the address comparing unit in the embodiment.

In FIG. 19, reference numeral 1102(n-1) denotes a local bus address bit of the (n-1)th bit and 1104(n-1) indicates a boundary address bit of the (n-1)th bit and each of them shows the most significant bit of each address of the local bus address 1102 and boundary address 1104. Reference numeral 1102(0) denotes the local bus address bit of the 0th bit and 1104(0) indicates a boundary address bit of the 0th bit and each of them shows the least significant bit of each address of the local bus address 1102 and boundary address 1104.

In FIG. 19, reference numerals 1201(n-1) to 1201(0) denote bit comparing means corresponding to the address bits of the (n-1)th to 0th bits.

Reference numeral 1202(n-1) denotes an EX-OR output signal which is outputted from an exclusive OR (hereinafter, referred to as an EX-OR) to which the local bus address 1102(n-1) and boundary address 1104(n-1) are inputted. Reference numeral 1203(n-1) denotes a bit comparison result signal which is outputted from the bit comparing means 1201(n-1).

Figures 20, 21:
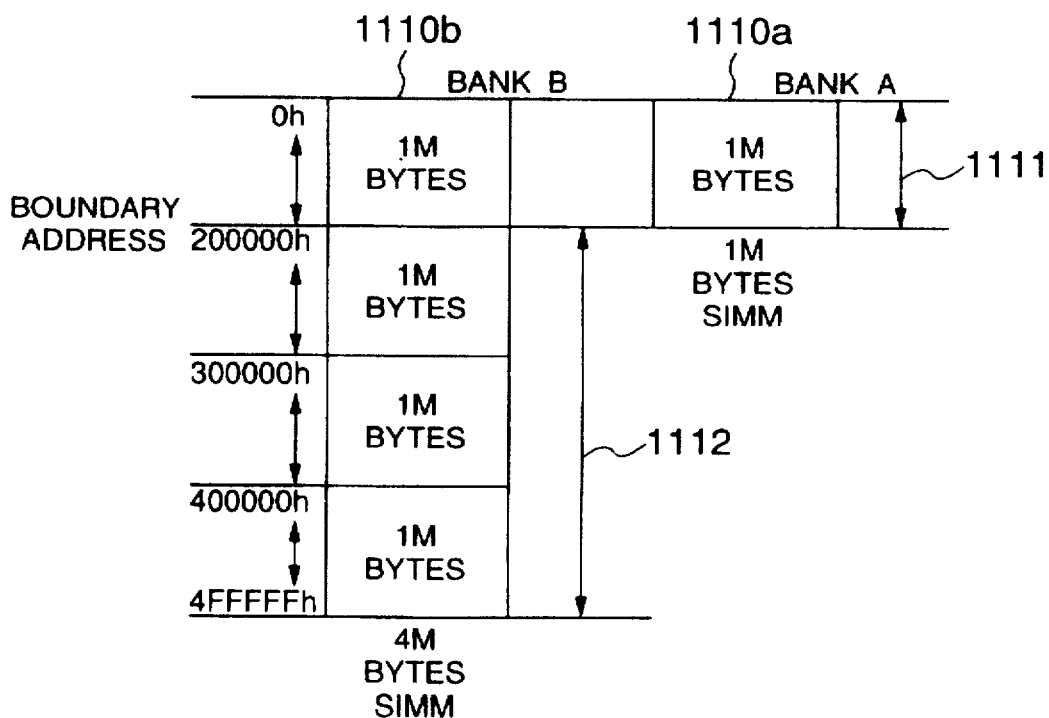
FIG. 20 is a diagram for explaining the operation of the address comparing unit shown in FIG. 19.
FIG. 21 is an address map diagram when an SIMM of 1 Mbytes and an SIMM of 4 Mbytes are used as an information memory medium in the embodiment in FIG. 17.

FIG. 20 is a diagram showing the operation of a logic circuit of the address comparing unit of the embodiment. In FIG. 20, "X" denotes a signal of "0" or "1". "1102>1104" indicates that the local bus address 1102 is larger than the boundary address 1104. "1102<1104" denotes that the local bus address 1102 is smaller than the boundary address 1104.

"?" indicates that it is set to "0" or "1" in accordance with the comparison result of the lower bit.

As shown in FIGS. 19 and 20, in the address comparing unit 1105 in the embodiment, the local bus address bit 1102(n-1) of the local bus address 1102 and the boundary address bit 1104(n-1) of the corresponding boundary address 1104 are inputted to the bit comparing means 1201(n-1). When the local bus address bit 1102(n-1) is at the low (L) ("0") level and the corresponding boundary address bit 1104(n-1) of the boundary address memory unit is at the high (H) ("1") level, namely, when the local bus address 1102 is smaller than the boundary address 1104, the bit comparison result signal 1203(n-1) is set to the "L" level. In the other cases, it is set to the "H" level.

The bit comparison result signal 1203(n-1) is inputted to an OR gate of a negative logic. When the bit comparison result signal 1203(n-1) is at the "L" level, the comparison result signal 1106 from the OR gate is set to the "H" level.

Namely, the local bus address 1102 which is outputted from the CPU 1101 exists in the interleave access area 1111. The address comparing unit 1105 validates the interleave access control unit 1107 and invalidates the non-interleave access control unit 1108.

When the comparison result by the bit comparing means 1201(n-1) with respect to the local bus address bit 1102(n-1) from the CPU 1101 and the corresponding boundary address bit 1104(n-1) of the boundary address memory unit 1103 is set to "H", namely, when the determination about whether the local bus address 1102 is smaller than the boundary address 1104 or not cannot be performed by the (n-1)th bit as a most significant address bit, it is determined by using comparisons of address bits of the (n-2)th bit or less.

When the EX-OR output signal 1202(n-1) is at the "L" level, the local bus address bit 1102(n-1) and boundary address bit 1104(n-1) are at the same level. In this instance, in a manner similar to the case where the (n-1)th bit of the address bit is compared, when the local bus address bit 1102(n-2) is at the "L" level and the boundary address bit 1104(n-2) is at the "H" level, the bit comparison result signal 1203(n-2) of the (n-2)th bit at the next stage is set to the "L" level and the comparison result signal 1106 is set to the "H" level, thereby validating the interleave access control unit 1107.

When the bit comparison result signal 1203(n-2) is at the "H" level, it is impossible to discriminate the magnitudes of the local bus address 1102 and boundary address 1104 by only the address bits of the (n-2)th bit or more. Therefore, in a manner similar to the above, the comparison of the address bit is performed by using a further lower bit.

When the bit comparison result signal 1203(n-1) is at the "H" level and the EX-OR output signal 1202(n-1) is at the "H" level, all of the comparison result signals of the bits of the (n-2)th bit or less are set to the "H" level. This means that the local bus address 1102 is larger than the boundary address 1104 and the comparison result signal 1106 is set to the "L" level.

When all of the corresponding address bits from the (n-1)th bit to the least significant 0th bit are equal, namely, when the local bus address 1102 and boundary address 1104 are equal, the address comparison result signal 1106 is set to the "L" level, thereby validating the non-interleave access control unit.

As mentioned above, by using the comparing means every address bit of the local bus address 1102 and boundary address 1104, the local bus address 1102 and boundary address 1104 can be compared.

As mentioned above, the interleave access control unit 1107 or non-interleave access control unit 1108 is selected by the address comparing unit 1105 in the embodiment.

In the embodiment, since the interleave access using a plurality of banks of different memory capacities is executed, there is a case where the number of bits of the memory address which can be respectively given to the bank differs in a plurality of banks of different bank capacities.

For example, when the interleave access is executed between the bank using a DRAM module having a memory capacity of 1M (mega) bytes in the 32-bit data construction (hereinafter, referred to as a 1 Mbyte SIMM) and the bank using a DRAM module having a memory capacity of 4 Mbytes, similarly, in the 32-bit data construction (hereinafter, referred to as a 4 Mbyte SIMM), addresses of 9 bits in case of the 1 Mbyte SIMM and addresses of 10 bits in case of 4 Mbyte SIMM have to be given to the row addresses and column addresses, respectively.

In such a case, although there is a possibility such that 9 bits of the memory address supplied to the 1 Mbyte SIMM overlap 9 bits of the memory address supplied to the 4 Mbyte SIMM, there is no need to allocate the local bus address to the memory address so as to prevent such an overlap.

Namely, even if the addresses of 9 bits to be supplied to the 1 Mbyte SIMM and 4 Mbyte SIMM overlap, since both of the SIMMs are not simultaneously accessed, there is no need to allocate the local address to the memory address. The reason why both of the SIMMs are not simultaneously accessed is because when the addresses of 9 bits to be supplied to the 1 Mbyte SIMM and 4 Mbyte SIMM overlap, for example, even in case of overlapping like an address of 9 bits which is supplied to the 1 Mbyte SIMM in FIG. 23 and lower 9 bits of the address which is supplied at the time of the non-interleave of the 4 Mbyte SIMM, the area to be accessed is selected due to the determination of the areas of the interleave and non-interleave, so that both of the SIMMs are not simultaneously accessed.

In the bank using the 4 Mbyte SIMM of a large memory capacity, since both of the interleave access and the non-interleave access are executed, when the interleave access and the non-interleave access are executed, the memory address is allocated so as not to overlap the memory address even on the 4 Mbyte SIMM.

The allocation of the local bus address 1102 outputted from the CPU 1101 to the memory address 1109 in case of using the bank A 1110a and bank B 1110b having different memory capacities in the embodiment will now be described.

FIG. 21 is a diagram showing an address map of the information memory medium 1110 when using the 1 Mbyte SIMM for the bank A 1110a and the 4 Mbyte SIMM for the bank B 110b in the embodiment. In FIG. 21, a numeral added with a symbol "h" denotes a memory address shown by a hexadecimal number.

As shown in FIG. 21, in the embodiment, there are provided: the interleave access area 1111 constructed by the bank A 1110a as a 1 Mbyte SIMM and lower 1 Mbytes of the bank B 1110b as a 4 Mbyte SIMM; and the non-interleave access area 1112 constructed by upper 3 Mbytes of the bank B 1110b as a 4 Mbyte SIMM.

A setting method of the boundary address in the information memory medium shown in FIG. 21 will now be signal line 1120 from the banks A and B by a method similar to the method described in FIG. 7 or 8 in the foregoing embodiment. The recognized memory capacities of the banks A and B are subsequently compared (step 2200).

Subsequently, the bank of the smallest memory capacity is determined as a bank A of the SIMM of 1 MB on the basis of the comparison result (step 2202). The whole memory area 1111 of the bank A of the minimum capacity is set as an interleave access area (step 2204).

Subsequently, the memory area 1111 of the same capacity (1 MB) as that of the bank (bank A here) of the smallest memory capacity in the whole memory area (4 MB) of the bank B is set to the interleave access area (step 2206). Further, the other area 1112 of the bank B is set to the non-interleave access area (step 2208).

Subsequently, the CPU 1101 sets address "200000h" indicative of a boundary between the interleave access area 1111 of 2 MB and the non-interleave access area 1112 of 3 MB in the bank B to the boundary address and stores into the boundary address memory unit 1103 through the signal line 1122 (step 2210).

FIG. 23 is an explanatory diagram showing an example of the allocation of the local bus address 1102 which is outputted by the CPU 1101 to the memory address 1109 of the information memory medium 1110 in the embodiment.

In FIG. 23, a numeral added with a symbol "A" indicates the number of bits of the local bus address 1102 to which the corresponding memory address bits are supplied.

As shown in FIG. 23, in the embodiment, in case of performing the interleave access to the bank A 1110a as a 1 Mbyte SIMM, local bus address bits A3 to A11 are supplied to the 0th to 8th bits of the column address of the 1 Mbyte SIMM and local bus address bits A12 to A20 are supplied to the 0th to 8th bits of the row address of the 1 Mbyte SIMM.

In the embodiment, when performing the interleave access to the bank B 1110b as a 4 Mbyte SIMM, the local bus address bits A3 to A11 are supplied to the 0th to 8th bits of the column address of the 4 Mbyte SIMM, the local bus address bit A20 is supplied to the 9th bit of the column address of the 4 Mbyte SIMM, the local bus address bits A12 to A19 are supplied to the 0th to 7th bits of the row address of the 4 Mbyte SIMM, "1" is supplied to the 8th bit of the row address of the 4 Mbyte SIMM, and "0" is supplied to the 9th bit thereof.

Further, in the embodiment, when executing the non-interleave access to the bank B 1110b as a 4 Mbyte SIMM, the local bus address bits A3 to A11 are supplied to the 0th to 8th bits of the column address of the 4 Mbyte SIMM, the local bus address bit A2 is supplied to the 9th bit of the column address of the 4 Mbyte SIMM, and the local bus address bits A12 to A21 are supplied to the 0th to 9th bits of the row address of the 4 Mbyte SIMM, respectively.

The supply of the memory address 1109 to each bank in the embodiment will now be described hereinbelow by using FIGS. 21 and 23.

As shown in FIG. 21, in the embodiment, in order to interleave the bank A 1110a as a 1 Mbyte SIMM and the bank B 1110b as a 4 Mbyte SIMM, the whole area of the bank A 1110a of the 1 Mbyte SIMM and the area of 1 Mbytes of the bank B 1110b of the 4 Mbyte SIMM are set to the interleave access area 1111, and address "0h" to address "1FFFFFh" of the local bus address 1102 are allocated as an interleave access area 1111 to lower bits in address "200000h" to address "4FFFFFh" of the local bus address 1102 are allocated.

Namely, in the embodiment, the boundary address 1104 is address "200000h" and such a boundary address 1104 is previously stored in the boundary address memory unit 1103.

In the DRAM, since the local bus address 1102 is time-divided into the column address and row address and inputted, the 1 Mbyte SIMM needs the memory address of 9 bits for each of the column address and the row address. On the other hand, the 4 Mbyte SIMM needs the memory address of 10 bits for each of the column address and the row address.

Therefore, when performing the interleave access in the bank A 1110a as a 1 Mbyte SIMM of the embodiment, as shown in FIG. 23, the local bus address bits A20 to A3 are allocated to the row address and column address of the bank A 1110a of the 1 Mbyte SIMM.

As shown in FIG. 23, when performing the interleave access in the bank B 1110b as a 4 Mbyte SIMM of the embodiment, in a manner similar to the bank A 1110a of the 1 Mbyte SIMM, the local bus address bits A20 to A3 are allocated to the row address and column address of the bank B 1110b of the 4 Mbyte SIMM. When performing the non-interleave access, the local bus address bits A21 to A2 are allocated to the row address and column address of the bank B 1110b of the 4 Mbyte SIMM.

As shown in FIG. 23, when performing the interleave access in the embodiment, "0" is given to the 9th bit of the row address and "1" is given to the 8th bit of the row address of the bank B 1110b as a 4 Mbyte SIMM. When performing the non-interleave access, the local bus address bit A21 is allocated to the 9th bit and the local bus address bit A20 is allocated to the 8th bit of the row address.

As mentioned above, when performing the interleave access in the embodiment, the local bus address bits which are supplied to the 9th and 8th bits of the memory address 1109 which are allocated to the bank A 1110a of the 1 Mbyte SIMM and the bank B 1110b of the 4 Mbyte SIMM are different with respect to the bank A 110a and bank B 110b.

In the apparatus embodying the memory control method of the embodiment, in order to perform the interleave access, the local bus address bit A3 which is supplied to the 0th bit of the memory address 1109 is separately supplied to the bank A 1110a and bank B 110b and their timings are different for the two banks.

The reason why "0" is given to the 9th bit and "1" is given to the 8th bit of the row address of the 4 Mbyte SIMM when performing the interleave access in the embodiment will now be described hereinbelow.

When performing the non-interleave access in the embodiment, since there are addresses from "200000h" to "4FFFFFh" in the non-interleave access area 1112, a combination such that the 9th bit of the row address which is allocated to the bank B 1110b of the 4 Mbyte SIMM is set to "0" and the 8th bit is set to "1" doesn't exist.

Therefore, the row address in which the 9th bit of the row address which is given to the bank B 1110b of the 4 Mbyte SIMM is set to "0" and the 8th bit is set to "1" is applied as a row address when performing the interleave access to the bank B 1110b of the 4 Mbyte SIMM.

By using the row address in which the 9th bit of the row address is equal to "0" and the 8th bit is equal to "1" as a row address when performing the interleave access, the different As described above, according to the embodiment, since whether the interleave access is executed or not is decided by comparing the local bus address 1102 and boundary address 1104, it is possible to perform the interleave access between the banks having different memory capacities and to access to the information memory medium 1110 at a high speed.

According to the embodiment, since the row address which is not used in the interleave access is used as a row address when performing the non-interleave access, the overlap of the memory address 1109 in a plurality of banks of different memory capacities can be prevented.

A memory control method and its apparatus according to another embodiment in which, in the apparatus embodying the memory control method of the invention, after a plurality of banks of the information memory medium were changed to two 1 Mbyte SIMMs and one 4 Mbyte SIMM, the interleave access or non-interleave access is executed will now be described.

In the embodiment, for example, when a plurality of banks (one 1 Mbyte SIMM and one 4 Mbyte SIMM) of the information memory medium 1110 of the construction of FIG. 21 are changed into two 1 Mbyte SIMMs and one 4 Mbyte SIMM, the interleave access area 1111, non-interleave access area 1112, and boundary address 1104 between them are changed.

That is, in the apparatus using one 1 Mbyte SIMM and one 4 Mbyte SIMM as shown in FIG. 21 as an information memory medium, for example, when one 1 Mbyte SIMM 1110c is further added, a construction is as shown in an address map diagram of FIG. 24. In the construction shown in FIG. 24, only the area 1111 becomes the interleave access area and another area 1113 becomes the non-interleave access area. In the embodiment, therefore, the added address area of the 1 Mbyte SIMM is set as shown in an address map diagram of FIG. 25, addresses "0h" to "400000h" of the local bus address 1102 are allocated to the interleave access area 1111, and addresses "400000h" to "5FFFFFh" of the local bus address 1102 are allocated to the non-interleave access area 1112.

Namely, in the embodiment, the boundary address 1104 indicates "400000h" and the boundary address is previously stored in the boundary address memory unit 1103.

Therefore, as shown in FIG. 25, in the embodiment, there are provided: the interleave access area 1111 constructed by lower 2 Mbytes of the bank A 1110a as a 4 Mbyte SIMM, the bank B 1110b as a 1 Mbyte SIMM, and the bank C 1110c as a 1 Mbyte SIMM; and the non-interleave access area 1112 constructed by upper 2 Mbytes of the bank A 1110a as a 4 Mbyte SIMM.

In the embodiment, since the boundary address 1104 is changed as shown in FIG. 25, the changed boundary address 1104 is stored into the boundary address memory unit 1103.

The CPU 1101 requests the information memory medium 1110 to perform the memory access, generates the local bus address 1102 of n bits, and generates the boundary address 1104 of n bits which has previously been stored in the boundary address memory unit 1103 to the address comparing unit 1105.

When the local bus address 1102 outputted by the CPU 1101 and the boundary address 1104 outputted by the boundary address memory unit 1103 are inputted to the address comparing unit 1105, the values of the local bus address 1102 and boundary address 1104 are compared in access control unit 1107 and non-interleave access control unit 1108. One of the interleave access control unit 1107 and non-interleave access control unit 1108 is selected on the basis of the comparison result signal 1106 and is validated, while the other is invalidated.

Namely, the address comparing unit 1105 determines whether the local bus address 1102 is included in which one of the interleave access area 1111 and the non-interleave access area 1112.

On the basis of the determination result, the corresponding interleave access control unit 1107 or non-interleave access control unit 1108 in each area is validated. Therefore, the interleave access can be performed by using the bank memories of different memory capacities while setting the boundary address 1104 to a boundary.

In the embodiment, the allocation of the local bus address 1102 outputted from the CPU 1101 to the memory address 1109 in case of using the bank A 1110a, bank B 1110b, and bank C 1110c of different memory capacities will now be described.

FIG. 26 is an explanatory diagram showing an example of the allocation of the local bus address 1102 which is outputted by the CPU 1101 to the memory address 1109 of the information memory medium 1110 in the embodiment.

As shown in FIG. 26, in the embodiment, when performing the interleave access to the bank B 1110b and bank C 1110c as 1 Mbyte SIMMs, the local bus address its A3 to A11 are supplied to the 0th to 8th bits of the column address of the 1 Mbyte SIMM and the local bus address bits A12 to A20 are supplied to the 0th to 8th bits of the row address of the 1 Mbyte SIMM.

In the embodiment, when the bank A 1110a as a 4 Mbyte SIMM performs the interleave access to the bank B 1110b as a 1 Mbyte SIMM, the local bus address bits A3 to A11 are supplied to the 0th to 8th bits of the column address of the 4 Mbyte SIMM, the local bus address bit A20 is supplied to the 9th bit of the column address of the 4 Mbyte SIMM, the local bus address bits A12 to A19 are supplied to the 0th to 7th bits of the row address of the 4 Mbyte SIMM, "0" is supplied to the 8th bit of the row address of the 4 Mbyte SIMM, and "1" is supplied to the 9th bit thereof.

In the embodiment, when the bank A 1110a as a 4 Mbyte SIMM executes the interleave access to the bank C 1110c as a 1 Mbyte SIMM, the local bus address bits A3 to A11 are supplied to the 0th to 8th bits of the column address of the 4 Mbyte SIMM, the local bus address bit A20 is supplied to the 9th bit of the column address of the 4 Mbyte SIMM, the local bus address bits A12 to A19 are supplied to the 0th to 7th bits of the row address of the 4 Mbyte SIMM, "1" is supplied to the 8th bit of the row address of the 4 Mbyte SIMM, and "1" is supplied to the 9th bit thereof.

Further, in the embodiment, when performing the non-interleave access to the bank A 1110a as a 4 Mbyte SIMM, the local bus address bits A3 to A11 are supplied to the 0th to 8th bits of the column address of the 4 Mbyte SIMM, the local bus address bit A2 is supplied to the 9th bit of the column address of the 4 Mbyte SIMM, and the local bus address bits A12 to A21 are supplied to the 0th to 9th bits of the row address of the 4 Mbyte SIMM.

The supply of the memory address 1109 to each bank in the embodiment will now be described hereinbelow by using FIGS. 25 and 26.

As shown in FIG. 25, in the embodiment, in order to interleave the bank A 1110a as a 4 Mbyte SIMM and the bank B 1110b or bank C 1110c as a 1 Mbyte SIMM, the area of 2 Mbytes of the bank A 1110a of the 4 Mbyte SIMM and the whole areas of the bank B 1110b and bank C 1110c as 1 Mbyte SIMMs are set to the interleave access area 1111 and addresses "0h" to "3FFFFFh" of the local bus address 1102 are allocated as an interleave access area 1111 to lower bits in the memory space.

The area of 2 Mbytes which is not designated as an interleave access area 1111 in the bank A 1110a as a 4 Mbyte SIMM is set to the non-interleave access area 1112 and addresses "400000h" to "5FFFFFh" of the local bus address 1102 are allocated.

Namely, in the embodiment, the boundary address 1104 which has previously been stored in the boundary address memory unit 1103 is set to address "400000h".

As shown in FIG. 26, in the embodiment, although the same memory address has been allocated to the bank B 1110b and bank C 1110c as 1 Mbyte SIMMs, a signal to strobe the row address is separately prepared for each bank, the strobe signal of the bank to which the access was requested is validated, and the other bank is invalidated, thereby preventing that both of the banks are simultaneously accessed.

When performing the interleave access in the bank B 1110b or bank C 1110c as a 1 Mbyte SIMM in the embodiment, as shown in FIG. 26, the local bus address bits A20 to A3 are given to the row address and column address of the bank B 1110b or bank C 1110c as a 1 Mbyte SIMM.

As shown in FIG. 26, when performing the interleave access in the bank A 1110a as a 4 Mbyte SIMM in the embodiment, in a manner similar to the bank B 1110b and bank C 1110c of the 1 Mbyte SIMMs, the local bus address bits A20 to A3 are given to the row address and column address of the bank A 1110a of the 4 Mbyte SIMM. When performing the non-interleave access, the local bus address bits A21 to A2 are given to the row address and column address of the bank A 1110a of the 4 byte SIMM.

As shown in FIG. 26, in the embodiment, when the bank A 1110a as a 4 Mbyte SIMM performs the interleave access to the bank B 1110b as a 1 Mbyte SIMM, "1" is given to the 9th bit of the row address of the bank A 1110a as a 4 Mbyte SIMM and "0" is given to the 8th bit of the row address. When the bank A 1110a as a 4 Mbyte SIMM performs the interleave access to the bank C 1110c as a 1 Mbyte SIMM, "1" is given to the 9th bit of the row address of the bank A 1110a as a 4 Mbyte SIMM and "1" is given to the 8th bit of the row address. When performing the non-interleave access, the local bus address bit A21 is given to the 9th bit of the row address of the bank A 1110a as a 4 Mbyte SIMM and the local bus address bit A20 is given to the 8th bit thereof.

As mentioned above, in the embodiment, when performing the interleave access, the local bus address bits which are supplied to the 9th bit and the 8th bit of the memory address 1109 which are supplied to the bank A 1110a of the 4 Mbyte SIMM and the bank B 1110b and bank C 1110c as 1 Mbyte SIMMs are different with respect to the bank A 1110a and the bank B 1110b and bank C 1110c.

In the embodiment, in order to perform the interleave access, the local bus address bit A3 which is supplied to the 0th bit of the memory address 1109 is separately supplied with respect to the bank A 1110a and the bank B 1110b or bank C 1110c and the timings are different with respect to the two banks for executing the interleave access.

The reason why "1" is given to the 9th bit and "0" is given to the 8th bit of the row address of the 4 byte SIMM or "1" is given to the 9th bit and "1" is given to the 8th bit when performing the interleave access in the embodiment will now be described hereinbelow.

In the embodiment, when performing the non-interleave access, since there are addresses from "400000h" to "5FFFFFh" in the non-interleave access area 1112. a combination such that the 9th bit of the row address which is supplied to the bank A 1110a of the 4 Mbyte SIMM is equal to "1" and the 8th bit is equal to "0" and a combination such that the 9th bit is equal to "1" and the 8th bit is equal to "1" don't exist.

Therefore. the row address in which the 9th bit of the row address which is supplied to the bank A 1110a of the 4 Mbyte SIMM is equal to "1" and the 8th bit is equal to "0" is applied as a row address when performing the interleave access to the bank A 1110a of the 4 Mbyte SIMM and the bank B 1110b of the 1 Mbyte SIMM. The row address in which the 9th bit of the row address which is supplied to the bank A 1110a of the 4 Mbyte SIMM is equal to "1" and the 8th bit is equal to "1" is applied as a row address when performing the interleave access to the bank A 1110a of the 4 Mbyte SIMM and the bank C 1110c of the 1 Mbyte SIMM.

By using the row address in which the 9th bit of the row address is equal to "1" and the 8th bit is equal to "0" and the row address in which the 9th bit of the row address is equal to "1" and the 8th bit is equal to "1" as a row address when performing the interleave access, the row addresses which are different in the bank A 1110a of the 4 Mbyte SIMM are selected for the interleave access area 1111 and non-interleave access area 1112. so that the addresses don't overlap in the bank A 1110a of the 4 Mbyte SIMM.

As described above, according to the embodiment, since whether the interleave access is executed or not is determined by comparing the local bus address 1102 and boundary address 1104. it is possible to perform the interleave access between the banks having the different memory capacities and to access to the information memory medium 1110 at a high speed.

According to the embodiment, since the row address which is not used in the non-interleave access is used as a row address when performing the interleave access, the overlap of the memory address 1109 in a plurality of banks of different memory capacities can be prevented.

According to the embodiment, when the interleave access area 1111 and non-interleave access area 1112 are changed. the boundary address 1104 between them is changed. Therefore, when the memory capacities of a plurality of banks constructing the information memory medium 1110 are arbitrarily changed. it is possible to execute the interleave access among the plurality of banks of the different memory capacities and to perform the memory access at a high speed.

Although the present invention has specifically been described on the basis of the embodiments, the invention is not limited to the foregoing embodiments but many modifications and variations are possible without departing from the spirit of the invention.

For example, in the memory control method and apparatus of the embodiments, the case of using the 1 Mbyte SIMM and 4 Mbyte SIMM as a plurality of banks of the different memory capacities has been shown as an example. However, memories of other memory capacities such as a combination of a 4 Mbyte SIMM and an 8 Mbyte SIMM or the like can be also used as a plurality of banks of the different memory capacities.

Effects which are obtained by the embodiments will now be briefly explained as follows.

Namely, since whether the interleave access is executed or not is determined by comparing the local bus address and the boundary address, it is possible to perform the interleave access among the banks having different memory capacities and to access to the information memory medium at a high speed.

When the interleave access area and non-interleave access area are changed. the boundary address between them is changed. Therefore, when the memory capacities of a plurality of banks constructing the information memory medium are arbitrarily changed. it is possible to perform the interleave access among the plurality of banks of the different memory capacities and to execute the memory access at a high speed.

The embodiment of the control method of the cache memory mentioned above can be applied to the embodiment of the control method and apparatus of the memory which can be interleave controlled as mentioned above.

Figure 27:
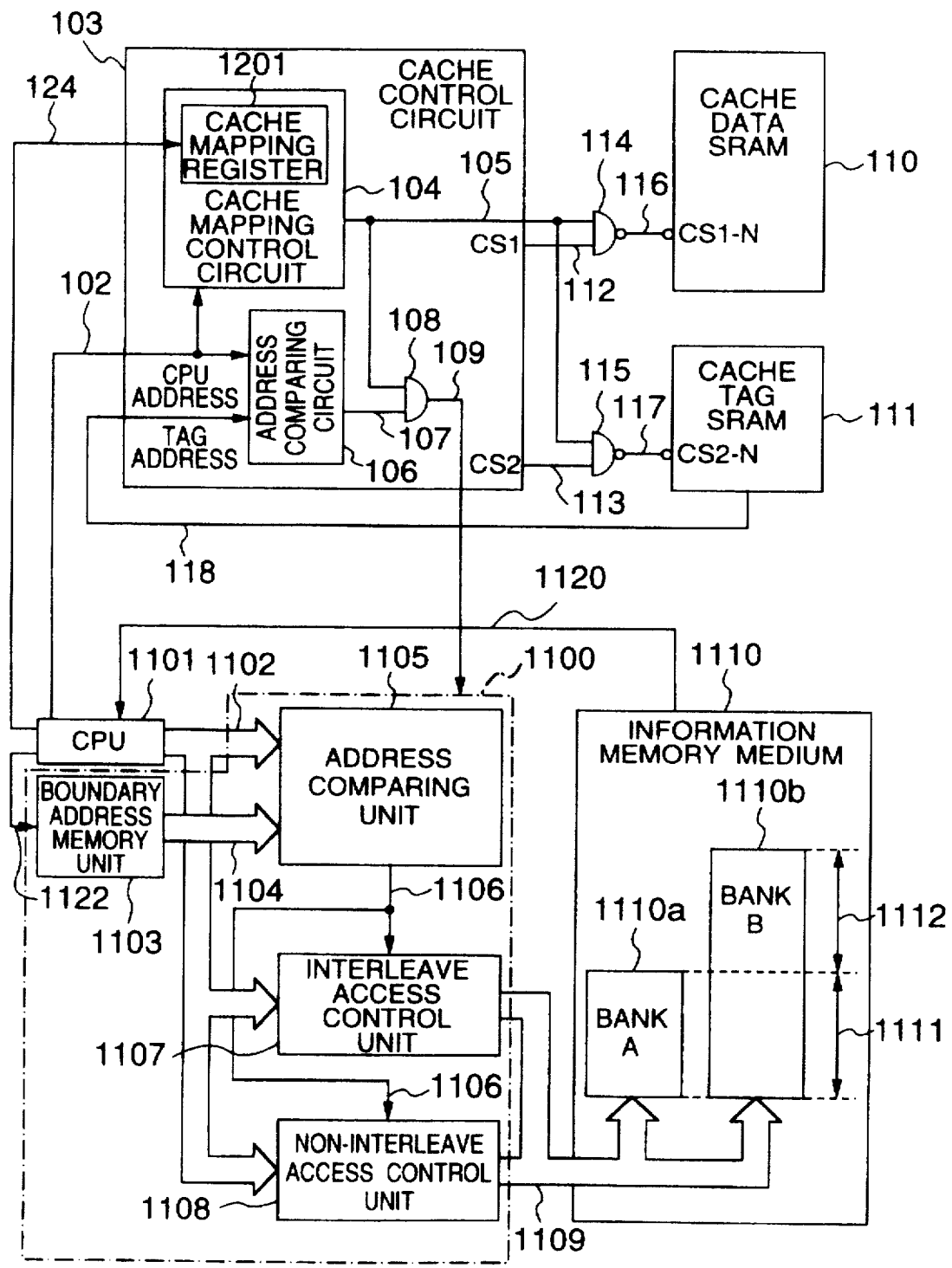
FIG. 27 is a block diagram showing a construction of an embodiment in which the embodiment of the control method of the cache memory in FIG. 3 is applied to the embodiment of the control method and apparatus of the memory capable of interleave control in FIG. 17.

FIG. 27 is a block diagram showing a construction of an embodiment in the case where the embodiment of the control method of the cache memory in FIG. 3 is applied to the embodiment of the control method and apparatus of the memory which can be interleave controlled in FIG. 17. In the embodiment of FIG. 27. in a manner similar to the embodiment of FIG. 3. at least a part of the non-interleave area in the information memory medium can be set to a cache target. At least a part of the interleave area can be also set to a cache target.

Namely. in FIG. 27, the determination signal 2 109 from the cache control circuit 103 is supplied to a main memory control circuit 1100 (including the boundary address memory unit 1103. address comparing unit 1105. interleave access control unit 1107. and non-interleave access control unit 1108). The main memory control circuit 1100 corresponds to the main memory control circuit 119 in FIG. 3. When the determination signal 2 109 is. for example. at the "H" level, the main memory control circuit 1100 is invalidated and the cache memory is accessed. When it is at the "L" level, the main memory control circuit 1100 is validated and the main memory is accessed.

What is claimed is:

1. A cache memory control method in a memory control apparatus which has a main memory constructed by a plurality of memory areas (banks) and a cache memory which can be accessed at a speed higher than that of said main memory and in which said main memory or said cache memory is accessed in response to a memory access request from an access request side and data is read out therefrom and transferred to said access request side, comprising the steps of:

a) identifying an accessing speed of every said plurality of memory areas in said main memory; and
   b) setting an area which is cachable for said cache memory among said plurality of memory areas in said main memory in accordance with said identified accessing speed of every said plurality of memory areas in said main memory.

2. A method according to claim 1. wherein said step b) has a step of setting at least a part of a memory area whose accessing speed is identified to be slower than that of the remaining memory areas among said plurality of memory areas in said main memory as a cachable area.

3. A method according to claim 1. wherein said step a) has a step of identifying said accessing speed by identifying whether said memory area is an area that can be interleave controlled or an area that cannot be interleave controlled.

4. A method according to claim 3. wherein said step b) has a step of. when it is determined that the memory area in said main memory is the area that cannot be interleave controlled. setting at least a part of said area that cannot be interleave controlled as an area which is cachable for said cache memory and. when it is determined that the memory area in said main memory is the area that can be interleave controlled, setting at least a part of said area that can be interleave controlled as an area which is not cachable for said cache memory.

5. A method according to claim 3, wherein said step b) has a step of, when it is determined that all of said memory areas in said main memory are the areas which cannot be interleave controlled, setting at least a part of said areas which cannot be interleave controlled as areas which are cachable for said cache memory.

6. A method according to claim 3, wherein said step b) has a step of, when it is determined that all of said memory areas in said main memory are the areas which can be interleave controlled, setting a part of said areas which can be interleave controlled as areas which are cachable for said cache memory.

7. A method according to claim 1, further comprising a step of, when data in said cache memory is updated, adding at least one of information (D, V) to realize a high speed of a memory access and to maintain a consistency of data between said main memory and said cache memory in addition to cache address information and giving as tag information to said cache memory.

8. A cache memory control apparatus in a memory control apparatus which has a main memory constructed by a plurality of memory areas (banks) and a cache memory which can be accessed at a speed higher than that of said main memory and in which said main memory or said cache memory is accessed in response to a memory access request from an access request side and data is read out therefrom and transferred to said access request side, comprising:

holding means for holding information about an accessing speed of every said plurality of memory areas in said main memory;

means for reading out the information about the accessing speed in an access area for said main memory shown by an access address sent from said access request side from said holding means in response to said access address; and cache memory control means for selectively setting the access area for said main memory shown by said access address as a cachable area (allocating to the cache memory, setting to a cache target) in accordance with the information regarding said accessing speed thus read out.

9. An apparatus according to claim 8, further comprising identifying means for identifying the accessing speed of every said plurality of memory areas in said main memory and storing the accessing speeds thus obtained into said holding means.

10. An apparatus according to claim 9, wherein said identifying means has means for identifying said accessing speed by identifying whether said memory area is an area that can be interleave controlled or an area that cannot be interleave controlled every said plurality of memory areas in said main memory.

11. An apparatus according to claim 8, wherein said cache memory control means has means for setting at least a part of the memory area whose accessing speed is identified to be slower than those of the remaining memory areas among said plurality of memory areas in said main memory as a cachable area.

12. An apparatus according to claim 8, wherein said holding means stores information indicating whether said memory area is the area that can be interleave controlled or the area that cannot be interleave controlled every said plurality of memory areas in said main memory as said accessing speed, and said cache memory control means has means for, when it is identified that the memory area in said main memory is the area that cannot be interleave controlled, setting at least a part of said area that cannot be interleave controlled as an area which is cachable for said cache memory and, when it is identified that said memory area in said main memory is the area that can be interleave controlled, setting at least a part of said area that can be interleave controlled as an area which is not cachable for said cache memory.

* * * * *